United States Patent
Søgaard

(10) Patent No.: US 9,079,135 B2
(45) Date of Patent: Jul. 14, 2015

(54) METHOD FOR REMOVING IMPURITIES FROM FLUE GAS CONDENSATE

(75) Inventor: Dennis Søgaard, Struer (DK)

(73) Assignee: PureteQ A/S (DK)

(*) Notice: Subject to any disclaimer, the term of this patent is extended or adjusted under 35 U.S.C. 154(b) by 0 days.

(21) Appl. No.: 14/233,517

(22) PCT Filed: Jul. 19, 2012

(86) PCT No.: PCT/EP2012/064190
§ 371 (c)(1),
(2), (4) Date: Jan. 17, 2014

(87) PCT Pub. No.: WO2013/011092
PCT Pub. Date: Jan. 24, 2013

(65) Prior Publication Data
US 2014/0170047 A1  Jun. 19, 2014

(30) Foreign Application Priority Data

Jul. 19, 2011  (EP) .................................. 11174529
Mar. 29, 2012 (EP) .................................. 12162016

(51) Int. Cl.
*B01D 53/34* (2006.01)
*B01D 53/50* (2006.01)
(Continued)

(52) U.S. Cl.
CPC ............... *B01D 53/73* (2013.01); *B01D 5/009* (2013.01); *B01D 53/002* (2013.01); *B01D 53/74* (2013.01); *C02F 1/66* (2013.01); *B01D 2257/60* (2013.01);
(Continued)

(58) Field of Classification Search
CPC ...... B01D 53/73; B01D 53/74; B01D 53/501; C02F 1/26; C02F 1/52; C02F 2103/18

USPC ................. 423/210, 243.01, 243.08, 243.11; 422/168–171; 210/702, 721, 758, 749, 210/175, 177, 180, 198.1, 513, 773, 724
See application file for complete search history.

(56) References Cited

U.S. PATENT DOCUMENTS 3,873,532 A   3/1975  Lahlstrom et al.
3,985,860 A  10/1976  Mandelik et al.
(Continued)

FOREIGN PATENT DOCUMENTS

DE  1459497 A1  4/1969
DE  3305802 A1  8/1984
(Continued)

OTHER PUBLICATIONS

Machine generated English translation of DE4424774 (attached), Jan. 1996.
(Continued)

*Primary Examiner* — Timothy Vanoy
(74) *Attorney, Agent, or Firm* — Lerner, David, Littenberg, Krumholz & Mentlik, LLP

(57) ABSTRACT

The present invention relates to a method for treating flue gas and/or condensates thereof suitable for removal of sulphur-containing compounds by contacting the flue gas condensate with a calcium-containing material to produce a liquid; cooling the liquid to a temperature below 60° C. or less, and adding a second material (such as carbon dioxide) to the cooled liquid to maintain the pH in range of 6 to 9 and separating off the resulting precipitate. The invention also relates to the purified flue gas and to a system for conducting the method according to the invention.

41 Claims, 3 Drawing Sheets

(51) Int. Cl.
  *B01D 53/74* (2006.01)
  *C02F 1/26* (2006.01)
  *C02F 1/52* (2006.01)
  *B01D 53/73* (2006.01)
  *B01D 53/00* (2006.01)
  *C02F 1/66* (2006.01)
  *B01D 5/00* (2006.01)
  *C02F 103/18* (2006.01)

(52) U.S. Cl.
  CPC ............ *B01D 2258/0283* (2013.01); *C02F 1/26* (2013.01); *C02F 1/5245* (2013.01); *C02F 2103/18* (2013.01); *C02F 2209/02* (2013.01)

(56) References Cited

U.S. PATENT DOCUMENTS

| | | | | |
|---|---|---|---|---|
| 4,289,730 | A | * | 9/1981 | Tomlinson .................... 422/178 |
| 4,371,508 | A | * | 2/1983 | Weinzierl et al. ........ 423/243.03 |
| 4,656,831 | A | * | 4/1987 | Budininkas et al. ............ 60/297 |
| 4,753,784 | A | * | 6/1988 | Neverman ..................... 423/235 |
| 4,873,065 | A | * | 10/1989 | Braun et al. .................. 423/210 |
| 6,581,375 | B2 | * | 6/2003 | Jagtoyen et al. ................ 60/309 |
| 2003/0106852 | A1 | * | 6/2003 | Erga .............................. 210/710 |
| 2004/0258597 | A1 | * | 12/2004 | Michalakos et al. ....... 423/245.3 |
| 2009/0294377 | A1 | * | 12/2009 | Gallot .......................... 210/737 |
| 2013/0037493 | A1 | * | 2/2013 | Konigsson et al. ........... 210/787 |

FOREIGN PATENT DOCUMENTS

| | | |
|---|---|---|
| DE | 4424774 A1 | 1/1996 |
| DE | 19740615 A1 | 3/1999 |
| EP | 1 621 520 A1 | 2/2006 |
| WO | 8100277 A1 | 2/1981 |
| WO | WO 94/16797 | 8/1994 |
| WO | 2010101953 A1 | 9/2010 |
| WO | 2010144190 | 12/2010 |

OTHER PUBLICATIONS

Machine generated English translation of DE 19740615 (attached), Mar. 1999.

Machine generated English translation of DE 1459497 (attached), Apr. 1968.

Machine generated English translation of WO 81/00277 (attached), Feb. 1981.

International Search Report for related international application PCT/EP2012/064190; mailed Oct. 17, 2012 (submitted to the USPTO Jan. 17, 2014).

International Preliminary Report on Patentability for related international application PCT/EP2012/064190; completed Oct. 29, 2013 (submitted to the USPTO Jan. 17, 2014).

Abstract of DE 33058802 in English (attached), Aug. 1994.

Extended European Search Report for Application No. EP11174529.5 dated Nov. 3, 2011.

* cited by examiner

METHOD FOR REMOVING IMPURITIES FROM FLUE GAS CONDENSATE

TECHNICAL FIELD

The present invention relates to a method and a system for removing impurities from flue gas and/or a condensate thereof. The invention further relates to a purified flue gas condensate obtainable by use of the inventive method. The invention also relates to a system for removing impurities from flue gas and/or a condensate thereof.

BACKGROUND

Various systems, methods and plants are available for cleaning flue gas. Flue gas contains various components including metals and compounds thereof. It is desirable to limit the concentration of these impurities from the flue gas prior to release of the flue gas into the atmosphere.

Typically, flue gas contains toxic heavy metals, such as lead, cadmium, mercury, barium. Further, flue gas typically contains solid components such as fly ash. These compounds and components are toxic and highly undesirable.

Thus, it is desirable to have these impurities extracted from the flue gas as they are highly toxic to the environment.

In power plants, flue gas resulting from burning of fossil fuel is often used to heat liquids, such as returning district heating water, in order to transfer the heat energy present in the flue gas to the liquid. Then, the heated liquid is often used to provide heat to housing in the surrounding society.

During this heat transfer process, the flue gas condenses, whereby a flue gas condensate is produced. This condensate contains major amounts of the toxic compounds originating from the flue gas. Large plants may produce very large amounts of dirty flue gas condensate. Typically, the production of energy from 1 tonne (1,000 kg) of oil produces approximately 1 tonne of water which is emitted with the flue gas. Production of the same amount of energy from wood (dry wood) requires approximately 2 tonnes of dry wood producing approximately 2 tonnes of water which is emitted with the flue gas. Production of the same amount of energy from e.g. willow requires 4 tonnes of willow (willow has a water content of typically 50%) and produces approximately 4 tonnes of water which is emitted with the flue gas. Thus, flue gas condensates are produced in enormous amounts.

Until the present invention, this condensate has routinely been discharged into the surrounding environment. However, this discharge of condensate presents a substantial risk to the environment and is therefore highly undesirable.

In order to discharge this condensate safely into the environment, it is necessary to remove or substantially reduce the amount of these toxic compounds in the condensate.

However, in order to make such purification feasible for use in purifying flue gas condensate, the process must be simple, effective and inexpensive. Thereby, the condensate may be turned into a resource in a simple and inexpensive way which may be used for a number of purposes including livestock watering, irrigation of crops, wetland habitat production, aquaculture and hydroponics. Thereby, the flue gas condensate can become a valuable resource. However, such potential use requires a sufficient purification of the condensate in order to sustain environmental suitability.

In conventionally used treatment methods, treatment is not sufficiently effective in purifying the flue gas to an environmentally safe level. Especially, the amounts of heavy metals have been unsatisfactory until the present invention in conventionally treated (or untreated) flue gas condensates.

Accordingly, there is always a need in the art for more effective purification of flue gas. Further, there is a need in the art for simple and inexpensive methods of reducing the amounts of heavy metals in flue gas condensates.

Further, there is a need in the art for producing flue gas condensate of a quality that makes it a resource for recycling uses.

The concentrated toxic compounds obtainable from the condensate may be used in other industries, e.g. in the cement industry.

DISCLOSURE OF THE INVENTION

Accordingly, one object of the invention was to provide a simple and inexpensive method for effectively purifying flue gas. A further object of the invention was to provide a simple and inexpensive method of purifying a flue gas condensate effectively.

The origin of the flue gas or a condensate thereof may come from several different sources such as from combustion of waste material, combustion of fuels, burning of wood material, biogases, oil production etc. It is also to be understood that the flue gas may be used in the method according to present invention in gaseous form or it may be a liquid condensate which may be partially aqueous.

According to the present invention, a flue gas condensate means an aqueous liquid formed at least partly from vapour present in the flue gas. Usually, when produced, flue gases are present at an elevated temperature. Upon cooling, some constituents of the flue gas will condense to a liquid, which is mentioned according to the invention as a flue gas condensate. Preferably, the condensate according to the invention is formed exclusively from vapour present in the flue gas condensate. A flue gas condensate in the present disclosure is preferably meant as being a dirty and unpurified flue gas condensate unless it is specifically stated that the flue gas condensate is "neutral" or "alkaline" meaning a purified flue gas condensate or a flue gas condensate in the process of being purified. However, when flue gas or a condensate thereof is formed the pH may also be low or very low pH. The final purified flue gas condensate in the present disclosure is a neutral flue gas condensate.

According to the present invention, a dirty flue gas condensate means an aqueous liquid formed at least partly from vapour present in the flue gas.

According to the present invention, a neutral flue gas or a condensate thereof means an aqueous liquid formed at least partly from vapour present in the flue gas, wherein the pH has been adjusted to a pH of e.g. about between about 5 to about 10, such as e.g. between about 6 to about 9, such as e.g. between about 7 to about 8, or such as e.g. about 5.0, such as e.g. about 5.5, such as e.g. about 6.0, such as e.g. about 6.5, such as e.g. about 7.0, such as e.g. about 7.5, such as e.g. about 8.0, such as e.g. about 8.5, such as e.g. about 9.0, such as e.g. about 9.5, such as e.g. about 10.0, such as e.g. about 10.5. Preferably, the neutral flue gas condensate has a pH of e.g. between about 7 to about 8.

According to the present invention, flue gas or a condensate thereof may also be acidic, such as having a pH in range of e.g. about −1 to about 5, such as e.g. about 0 to about 4, such as e.g. about 1 to about 3, such as e.g. about 1 to about 2, such as e.g. about 0, such as e.g. about 0.5, such as e.g. about 1.0, such as e.g. about 1.5, such as e.g. about 2.0, such as e.g. about 2.5, such as e.g. about 3.0, such as e.g. about 3.5, such as e.g. about 4.0, such as e.g. about 4.5

According to the present invention, an alkaline flue gas or a condensate thereof means an aqueous liquid formed at least partly from vapour present in the flue gas having a pH of e.g.

about 9 or above, such as e.g. about 9.5 or above, such as e.g. about 10.0 or above, such as e.g. about 10.5 or above, such as e.g. about 11.0 or above, such as e.g. about 11.5 or above, such as e.g. about 12.0 or above, such as e.g. about 12.5 or above, such as e.g. about 13.0 or above, such as e.g. about 13.5 or above, such as e.g. about 14 or above, such as e.g. about 14.5 or above. Preferably, the alkaline flue gas condensate has a pH of e.g. between about 10 to about 15, such as e.g. between about 11 to about 14, e.g. between about 11 to about 14, e.g. between about 12 to about 13.

The flue gas condensate contains the major amounts of the toxic impurities initially present in the flue gas. The amount of condensate produced per volume of flue gas depends on the origin of the flue gas, i.e. depends on the fuel used for producing the flue gas. Substantial amounts of condensate are achieved when burning biological fuels, such as wood, straw, chips and energy tablets.

Another object of the invention was to provide a method preserving the heat energy of flue gas, while simultaneously providing a liquid waste product sufficiently pure to be directly discharged into the environment or used as a safe water resource, while simultaneously providing a concentrated solid waste product containing the major amounts of toxic compounds initially present in the flue gas.

EP1621520 discloses a method and apparatus for generating fresh water using different kinds of exhaust combustion gas and sea water. The methods and apparatuses described in the prior art are not suitable for handling condensed flue gas and reducing the amount of toxic metals.

Moreover, i.a. sulphur dioxide ($SO_2$) is a gas which is created by the oxidation of sulphur-containing materials such as coal, oil and natural gas. Consequently, an array of sulphur-containing compounds are present in flue gas, such as e.g. thiols or mercaptanes (R—SH), sulphur dioxide ($SO_2$), sulphur trioxide ($SO_3$), hydrogen sulphide ($H_2S$) etc. Thus, it is desirable to develop efficient processes for removal of such compounds prior to release of flue gases or condensates thereof into the environment. For a long time, it has been deemed desirable to limit the concentration of sulphur dioxide in flue gasses which are released into the atmosphere. This has commonly been achieved by treating the industrial combustion gases by wet scrubbing with an aqueous alkaline scrubbing liquid. The resulting scrubbing liquids may contain considerable loads of sulphate, typically in the form of highly soluble sodium sulphate ($NaSO_4$). This is in particular the case where comparatively low amounts of calcium carbonate are used in wet scrubbing to prevent the formation of calcium sulphate precipitates within the wet scrubber. Increased sulphate concentrations in wastewater are generally undesirable due to the corrosiveness of sulphate towards copper conduits and the risk of reductive formation of toxic and corrosive hydrogen sulphide ($H_2S$).

U.S. Pat. No. 3,873,532 discloses a method for removing sulphur dioxide from flue gasses by wet scrubbing. According to the specification, the sulphur dioxide-containing gases are conducted to a gas scrubber, where they are washed with an aqueous alkaline scrubbing liquid based on sodium hydroxide or sodium carbonate. A partial flow of the liquid is drawn off from the gas scrubber to be regenerated and is conducted to a vessel for the addition of calcium ions in the form of $Ca(OH)_2$. The liquid is fed to a sedimentation device for sedimentation of precipitated calcium sulphate which is recycled to the vessel. The washing liquid supernatant is fed to a device for addition of sodium carbonate for further reduction of calcium ions before the liquid is returned to the scrubber. It is disclosed that this method prevents scaling in the scrubbing apparatus.

WO94/16797 discloses a method for cleaning sulphur dioxide-containing flue gases. The gases are treated in a gas scrubber for the absorption of sulphur dioxide in an aqueous alkaline washing liquid such as NaOH. A partial flow of the liquid is drawn off from the washing liquid to be regenerated by the addition of calcium ions (e.g. $Ca(OH)_2$) to precipitate calcium sulphate in a sedimentation device. The precipitated calcium sulphate is recycled to the partial flow of washing liquid before the addition of calcium ions for the promotion of crystal growth and eventually large and pure gypsum crystals. The washing liquid supernatant is fed to a different vessel for the addition of sodium carbonate in order to precipitate calcium ions in form of calcium carbonate. This precipitate is sedimented prior to the redirection of the liquid back into the scrubber. The precipitated calcium carbonate is recycled to the step of addition of calcium ions to the liquid.

However, one of the drawbacks of these two prior art methods is that the recycled liquid must pass through all the steps of the processes rendering the methods both cumbersome and material and energy-demanding. It follows that the larger volumes of liquid to be treated, larger volumes of e.g. chemicals must be used.

Thus, the present invention sets out to provide a method of treating sulphur-containing flue gases or condensates thereof. The sulphur-containing compound present in flue gases or condensates thereof may be e.g. thiols or mercaptanes (R—SH), sulphur trioxide ($SO_3$), sulphur dioxide ($SO_2$) or hydrogen sulphide ($H_2S$). Thus, the present invention sets out to provide a method for treating sulphur-containing flue gases dealing with the above-mentioned drawbacks of the prior art methods. Accordingly, the invention provides a simple method for regenerating the scrubbing liquid in a zone outside the scrubber and further, the method is capable of separating sulphate from the liquid to a degree that allows disposal of the liquid into the public sewer system (maximum sulphate concentration may be e.g. about 500-1500 mg/L). Moreover, it is clear that the compounds formed in the method according to present invention is a salt between calcium and sulphur, such that if e.g. $SO_3$ is to be removed, the salt formed is $CaSO_3$, or if e.g. $H_2S$ is to be removed the salt is CaS which decomposes in contact with water. However, it is also to be understood that even though transiently unstable salts are formed, the present invention can still be applied provided that the salts formed in the process are decomposing slowly (i.e. slow kinetics in decomposition).

For example, if $H_2S$ is to be removed from the flue gas or a condensate thereof, CaS is formed, which is not stable in contact with water and decomposes according to the scheme below.

$$CaS+H_2O \rightarrow Ca(SH)(OH)$$

$$Ca(SH)(OH)+H_2O \rightarrow Ca(OH)_2+H_2S$$

However, the decomposition is slow (typically 1 to 2 days to complete decomposition) allowing for ample time to have CaS removed from the aqueous phase. Moreover, it is also to be understood that the pH used in the method according to the invention may be tuned to amplify stability (i.e. to slow down decomposition of any salts) or to fine-tune the solubility of any salts formed, e.g. such that a poorer solubility results at a certain pH allowing for a more efficient removal of larger amounts of salt.

Thus, it is a first object of the present invention to provide a method of treating sulphur dioxide or sulphur compound-containing flue gases or condensates thereof in a wet scrubber, which method allows part of the scrubbing liquid used in the wet scrubber to be discharged in the public sewer or the like.

It is a second object of the present invention to provide a method of treating sulphur dioxide or sulphur compound-containing flue gases or condensates thereof in a wet scrubber, wherein precipitation inside the wet scrubber is reduced, in particular where calcium salt precipitation and scaling, such as calcium sulphate precipitation is prevented or reduced.

It is a third object of the present invention to provide a method of treating sulphur dioxide or sulphur compound-containing flue gases or condensates thereof in a wet scrubber, which method is simple, low-maintenance and/or cost-effective.

It is a fourth object of the present invention to provide a method of treating sulphur dioxide or sulphur compound-containing flue or condensates thereof in a wet scrubber, where purifying of the scrubbing liquid is performed in a zone outside the scrubbers.

It is another object of the present invention to provide a method of treating sulphur dioxide or sulphur compound-containing flue gases or condensates thereof in a wet scrubber, which method reduces the consumption of chemicals and/or water and/or reduces the amount of wastewater.

Furthermore, the method and systems of present invention are not only applicable for removal of $SO_2$ from flue gases, but may also be applicable for removing any kind of sulphur-containing compounds, such as e.g. thiols/mercaptanes, sulphur trioxide, hydrogen sulphide etc. Consequently, according to present invention, a sulphur-containing material may be any material, gaseous, liquid or solid, which comprises at least partly any compound comprising sulphur atom, such as e.g. thiols/mercaptanes, sulphur trioxide, hydrogen sulphide or any mixtures thereof.

DISCLOSURE OF THE INVENTION

Figure 1:
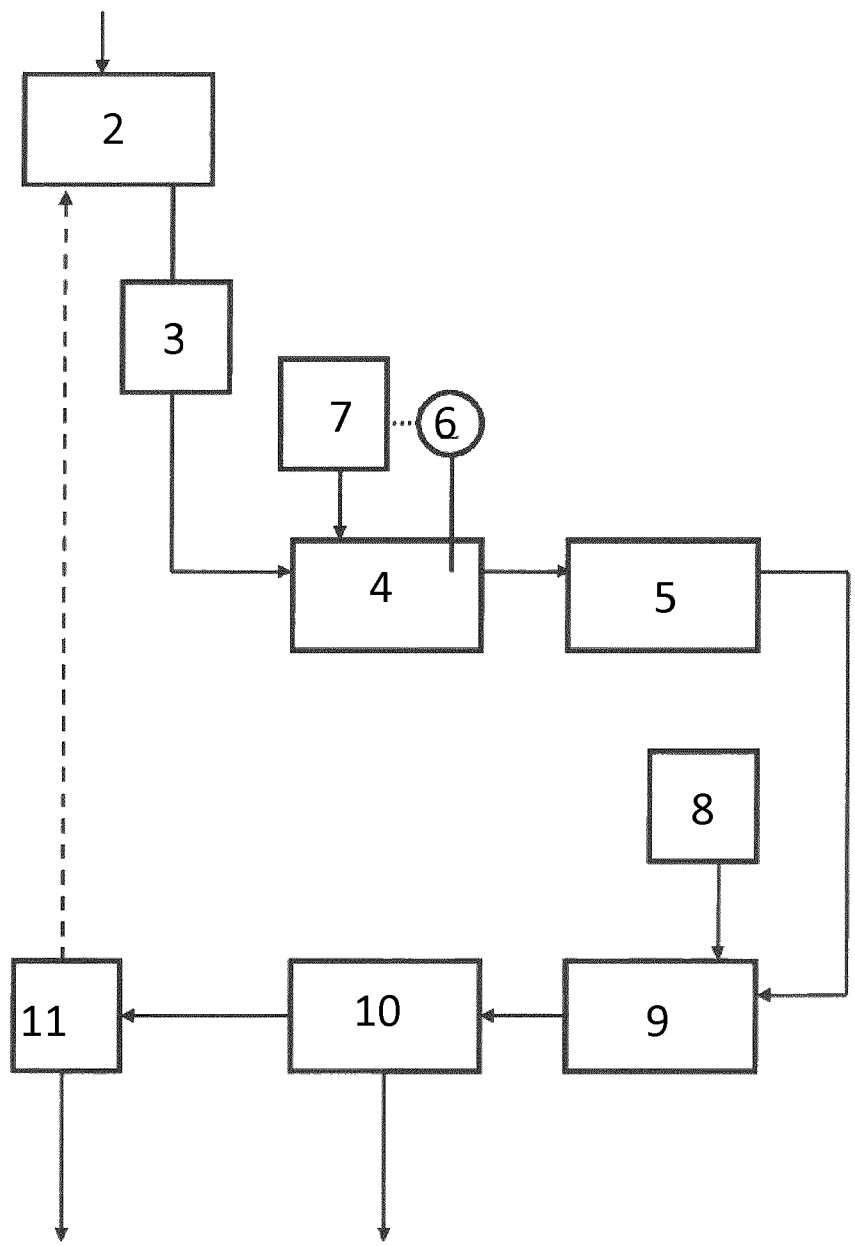
FIG. 1 is a schematic flow chart of the system according to the invention.

In the experimental process leading to the present invention, the inventor found that addition of alkaline calcium-containing substances, such as lime or dissolved calcium hydroxide, to the condensate in an amount sufficient to produce a pH of at least 11 followed by treatment allowing a precipitate of calcium-containing insoluble salts to be formed followed by removal of the precipitate from the condensate is very easy implementable and very efficient in purifying condensates originating from flue gas.

Thus, the objects of the present invention were solved by the inventive process described below.

According to a first aspect, the invention relates to a method for treating flue gas condensate, the method comprising; a first step of providing a flue gas condensate, a second step of adding a calcium-containing alkaline material and adjusting the pH of the flue gas condensate to a pH of 11-14, thereby providing an alkaline flue gas condensate, a third step of adjusting the pH of the alkaline flue gas condensate to a pH of 6-9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities.

According to another aspect, the invention relates to a method for treating flue gas condensate, the method consisting of a first step of providing a flue gas condensate, a second step of adding a calcium-containing alkaline material and adjusting the pH of the flue gas condensate to pH about 11 to about 14, thereby providing an alkaline flue gas condensate, the method further comprising a third step of adjusting the pH of the alkaline flue gas condensate to a pH of about 6 to about 9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities. Additionally, the pH may be adjusted to a pH of e.g. about between about 5 to about 10, such as e.g. between about 6 to about 9, such as e.g. between about 7 to about 8, or such as e.g. about 5.0, such as e.g. about 5.5, such as e.g. about 6.0, such as e.g. about 6.5, such as e.g. about 7.0, such as e.g. about 7.5, such as e.g. about 8.0, such as e.g. about 8.5, such as e.g. about 9.0, such as e.g. about 9.5, such as e.g. about 10.0, such as e.g. about 10.5 in the case of a neutral flue gas condensate.

Also, in the case of an alkaline flue gas condensate, the pH may be regulated to pH of e.g. about 9 or above, such as e.g. about 9.5 or above, such as e.g. about 10.0 or above, such as e.g. about 10.5 or above, such as e.g. about 11.0 or above, such as e.g. about 11.5 or above, such as e.g. about 12.0 or above, such as e.g. about 12.5 or above, such as e.g. about 13.0 or above, such as e.g. about 13.5 or above, such as e.g. about 14 or above, such as e.g. about 14.5 or above. Preferably, the alkaline flue gas condensate has a pH of e.g. between about 10 to about 15, such as e.g. between about 11 to about 14, e.g. between about 11 to about 14, e.g. between about 12 to about 13.

According to another aspect, the invention relates to a method for treating flue gas condensate, the method consisting of a first step of providing a flue gas condensate, a second step of adding a calcium-containing alkaline material and adjusting the pH of the flue gas condensate to a pH of about 11 to about 14, thereby providing an alkaline flue gas condensate, a third step of adjusting the pH of the alkaline flue gas condensate to a pH of about 6 to about 9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities.

By this process, impurities and toxic products, such as heavy metals and fly ash, are removed effectively from the flue gas condensate, and a purified aqueous condensate is obtained. Surprisingly, the method is simpler and easier to implement than previously known purification methods although the purification is superior to the known methods.

Examples of metals or heavy metals that may be removed from the flue gas or a condensate thereof by the method according to the invention are e.g. lead, mercury, copper, nickel, tin, aluminium, zinc, thallium, barium, molybdenum, chromium or cadmium etc. Furthermore, half-metals and non-metals may also be present and may consequently also be removed by using the method according to the invention. Such elements may e.g. be antimony or arsenic.

Thus, the method is effective, inexpensive and simple to perform.

In order to condense the flue gas, the flue gas is preferably led into a heat exchanger, where heat energy is transferred from the flue gas to a liquid. A wet scrubber may be seen as a heat exchanger, and the scrubbing liquid may therefore be seen as the flue gas condensate. However, in a preferred embodiment, the flue gas is not treated in a wet scrubber prior to addition of the alkaline material to the flue gas condensate. This is because it was surprisingly shown that the present invention was capable of providing sufficient purification of both the flue gas and the condensate without the need of a prior wet scrubbing treatment.

In a preferred embodiment of the invention, the flue gas condensate is obtained by leading the flue gas into an initial zone comprising a heat exchanger. Said heat exchanger regulates the temperature of the flue gas to approx. 60° C., at which temperature the flue gas condenses, while the heat energy of the flue gas is transferred to a liquid which may be further heated in the plant producing the flue gas.

Thereby, it is possible to use heat from the flue gas, e.g. to heat returning district heating water from a lower temperature to a higher temperature.

Typically, the flue gas has a temperature of 120-180° C., such as 160° C., and is cooled to a temperature around 40-70° C., such as 60° C., in the heat exchanger. By this cooling, the flue gas produces substantial amounts of liquid condensate. It is to be understood that the temperature at which a condensate is obtained may vary with the constitution of the flue gas to be purified. Consequently, the temperature in the heat exchanger may be in the range of e.g. about 30° C. to about 80° C., such as e.g. about 40° C. to about 70° C., such as e.g. about 50° C. to about 60° C., or such as e.g. about 30° C., such as e.g. about 35° C., such as e.g. about 40° C., such as e.g. about 45° C., such as e.g. about 50° C., such as e.g. about 55° C., such as e.g. about 60° C., such as e.g. about 70° C., such as e.g. about 75° C., such as e.g. about 80° C., such as e.g. about 85° C., such as e.g. about 90° C., such as e.g. about 95° C.

Thereby, the flue gas has transferred its energy to heat water and most of its toxic impurities to the flue gas condensate. The flue gas thus purified may thereafter be discharged into the atmosphere. Alternatively, in a preferred aspect of the present invention, the flue gas thus purified may be further purified and used as a $CO_2$-containing material for lowering the pH of the alkaline condensate produced later in the present process. Thereby, a simpler and more efficient purification of both flue gas and flue gas condensate is provided.

According to the inventive method, the flue gas condensate is treated by adding a calcium-containing alkaline material and adjusting the pH of the flue gas condensate to a pH of 11-14 by, thereby providing an alkaline flue gas condensate.

Preferably, the flue gas condensate has a pH of about 6 or below.

Even more preferred, the flue gas condensate is treated by adding the flue gas condensate to a calcium-containing alkaline material having a pH 11-14. Preferably, this calcium-containing alkaline material having a pH 11-14 is an alkaline flue gas condensate. Preferably, the amount of calcium is at or slightly above the solubility limit of the calcium-containing compound in the liquid.

Thus, in a preferred aspect of the invention, the second step of adding a calcium-containing alkaline material and adjusting the pH of the flue gas condensate provided in step 1 to a pH of 11-14, thereby providing an alkaline flue gas condensate, is achieved by adding the flue gas condensate provided in step 1 to a calcium-containing alkaline material having a constantly regulated pH of 11-14.

Accordingly, the invention relates in a further aspect to a method of treating flue gas condensate, the method comprising; a first step of providing a flue gas condensate, a second step of adding the flue gas condensate to a calcium-containing alkaline material having a pH of 11-14, thereby providing an alkaline flue gas condensate, a third step of adjusting the pH of the alkaline flue gas condensate to a pH of 6-9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities.

According to another aspect, the invention relates to a method for treating flue gas condensate, the method consisting of a first step of providing a flue gas condensate, a second step of adding the flue gas condensate to a calcium-containing alkaline material having a pH of 11-14, thereby providing an alkaline flue gas condensate, the method further comprising a third step of adjusting the pH of the alkaline flue gas condensate to a pH of 6-9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities.

According to another aspect, the invention relates to a method of treating flue gas condensate, the method consisting of a first step of providing a flue gas condensate, a second step of adding the flue gas condensate to a calcium-containing alkaline material having a pH of 11-14, thereby providing an alkaline flue gas condensate, a third step of adjusting the pH of the alkaline flue gas condensate to a pH of 6-9 by adding a second material, whereby a neutral flue gas condensate comprising a calcium-containing precipitate is formed, a fourth step of separating the calcium-containing precipitate from the neutral flue gas condensate, thereby providing a purified flue gas condensate and a concentrated solid mass comprising the impurities.

The heavy metals present in the flue gas condensate will precipitate in the alkaline flue gas condensate as heavy metal hydroxide salts.

Preferably, the alkaline flue gas condensate is kept under constant agitation.

Thereafter, the alkaline flue gas condensate is treated in a third step by adjusting the pH of the alkaline flue gas condensate to neutral pH, i.e. a pH of 6-9, by adding a second material. By this treatment, a neutral flue gas condensate comprising a calcium-containing precipitate is formed. This precipitate was surprisingly found to trap or capture other impurities or precipitates, i.e. fly ash components and heavy metal precipitates formed from salts of heavy metals and hydroxyl ions in the alkaline flue gas condensate.

Thereafter, the precipitates from the neutral flue gas condensate are separated from the liquid part of the condensate. This may be performed by conventional means.

In the second step of the method, an alkaline calcium-containing material is added to the flue gas condensate, and the pH of the condensate is adjusted from a low pH level to a pH of 11-14. Preferably, the pH adjustment is achieved exclusively by adding the alkaline calcium-containing material. Preferably, the alkaline calcium-containing material is calcium hydroxide $Ca(OH)_2$ or calcium oxide $CaO$ or a mixture thereof. The step of raising the pH may e.g. be carried out by producing a calcium hydroxide ($Ca(OH)_2$) solution/suspension, e.g. by addition of lime to water. Thereafter, this solution/suspension may be added to the flue gas condensate.

In the method according to the invention, an basic material, usually a metal oxide, hydroxide or carbonate, is added. Such metals may e.g. be sodium or potassium hydroxides, oxides or carbonates. More preferably, alkali earth metal hydroxides, carbonates or oxides may be used. For example, beryllium, magnesium, calcium, strontium and barium may be present in the form of their respective hydroxides, carbonates or oxides or any combination thereof. Any combination of a certain metal or metals may be used, e.g. $MgCO_3$ in combination with MgO and/or CaO and/or $CaCO_3$. Thus, it is to be understood that by the term calcium-containing material used throughout the invention is meant a solid, suspension or solution, in particular aqueous solution or suspension of any strength, comprising calcium hydroxide $Ca(OH)_2$, calcium oxide CaO or calcium carbonate ($CaCO_3$) or any mixtures thereof.

Even more preferred, in the second step of the method, the flue gas condensate is added to an alkaline calcium-containing material having a pH of 11-14. Thereby, the pH of the flue gas condensate is raised instantaneously to highly alkaline. Preferably, the alkaline calcium-containing material is a solution of calcium hydroxide $Ca(OH)_2$ or calcium oxide CaO or a mixture thereof. Preferably, the alkaline calcium-containing material comprises or consists of calcium-containing alkaline flue gas condensate.

Calcium hydroxide is only sparsely soluble in water, with a solubility of approximately 1.5 g per litre at 25° C. Limewater is the common name for a subsaturated or saturated calcium hydroxide solution, whereas milk of lime is the common name for a suspension (supersaturated) of lime in water. While limewater is a clear solution, milk of lime is a suspension of calcium hydroxide particles in water (saturated with calcium hydroxide) giving it a milky appearance. Commonly, lime water and milk of lime is produced by reacting calcium oxide (CaO or quicklime) with an excess of water—usually 4 to 8 times the amount of water to the amount of quicklime. Sometimes, reacting water with quicklime is referred to as "slaking" the lime. Following addition of water, calcium oxide will convert to the hydroxide according to the following reaction scheme:

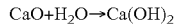

$$CaO + H_2O \rightarrow Ca(OH)_2$$

The mixture needs to be shaken to ensure that the solution is saturated with calcium hydroxide. It is then left to settle and the clear "saturated" solution (lime water) is collected.

Thus, in a preferred embodiment of the invention, the calcium-containing alkaline material is $Ca(OH)_2$ or CaO or a mixture and aqueous solution thereof. Using such an alkaline material causes the metals in the aqueous liquid to react with $OH^-$ and to form metal hydroxide compounds.

$Ca(OH)_2$ has a solubility in water of about 1.7 g/L (20° C.).

It was surprisingly observed that significantly improved purification was achieved by adding CaO and/or $Ca(OH)_2$ in the form of a saturated aqueous solution or oversaturated suspension of CaO and/or $Ca(OH)_2$ in water. In a preferred embodiment, CaO and/or $Ca(OH)_2$ is preferably added to the dirty flue gas condensate in the form of an aqueous solution or suspension of CaO and/or $Ca(OH)_2$ in water. Thus, in a preferred embodiment CaO and/or $Ca(OH)_2$ is added in the form of a nearly saturated aqueous solution or oversaturated suspension of CaO and/or $Ca(OH)_2$ in water containing between about 1.4 g to about 170 g per litre water (at about 20° C.). Even more preferred, CaO and/or $Ca(OH)_2$ is added in the form of an oversaturated suspension of CaO and/or $Ca(OH)_2$ in water containing between about 50 g to about 150 g per litre water. Even more preferred, CaO and/or $Ca(OH)_2$ is added in the form of an oversaturated suspension of CaO and/or $Ca(OH)_2$ in water containing between about 80 g to about 120 g per litre water.

In a most preferred embodiment, the suspension of CaO and/or $Ca(OH)_2$ in water contains about 100 gram $Ca(OH)_2$ per litre water.

When the flue gas condensate contains sulphur compounds, the addition of alkaline calcium may result in a precipitation of calcium sulphate $CaSO_4$ and/or calcium sulphite $CaSO_3$. This precipitate is also removed or reduced according to the present inventive method.

When raising the pH of the condensate to a pH of 11-14, the heavy metal impurities will react with the hydroxyl groups and create insoluble or slightly soluble metal salts, such as lead hydroxide, cadmium hydroxide, mercury hydroxide, barium hydroxide.

However, it was surprisingly observed during the experiments leading to the present invention that precipitated heavy metal hydroxides formed under the alkaline conditions provided did not—to any significant degree—re-dissolve in the neutral flue gas condensate produced later in the process. It was even surprisingly observed that the calcium-containing precipitate formed in the neutral flue gas condensate was able to "trap" precipitated heavy metal hydroxides such that these co-precipitated. This was a significant advantage as it obviated the need for more than one step of separating the liquid condensate into a precipitate and a retentate. Further, the "entrapment" of the heavy metal hydroxide precipitate in the calcium-containing precipitate microparticles was seen as a convenient and effective way of controlling these highly toxic compounds.

Thus, the step of separating the calcium-containing precipitate from the neutral flue gas condensate, thereby providing a purified flue gas condensate, is preferably the first step of separating a precipitate from the condensed flue gas. Accordingly, in one embodiment, the step of separating the calcium-containing precipitate from the neutral flue gas condensate is a first separation step.

Preferably, at least the alkaline flue gas condensate is kept under constant agitation. Preferably, the neutral flue gas condensate is kept under constant agitation prior to performing the step of separating the calcium-containing precipitate from the neutral flue gas condensate.

The precipitate may be discarded or it may be reused for a different purpose, e.g. in the cement industry.

In a preferred embodiment, the liquid is thereafter led to the second zone, where the pH is adjusted to 6-9. At this pH level, calcium-containing compounds will precipitate and form porous microparticles. Preferable the pH is adjusted to approximately 7.

Even more preferred, in the third step of the method, the alkaline flue gas condensate is added to a neutral calcium-containing solution having a pH of 6-9. Preferably, this solution is regulated at neutral pH by the addition of the second material, preferably a weak acid and more preferably a $CO_2$-containing gas. Thereby, the pH of the alkaline flue gas condensate is lowered to neutral instantaneously. Preferably, the neutral calcium-containing material comprises or consists of calcium-containing neutral flue gas condensate.

Accordingly, in a preferred aspect of the invention, the third step of adjusting the pH of the alkaline flue gas condensate provided in step 2 to a pH of 6-9 by adding a second material, thereby forming a neutral flue gas condensate comprising a calcium-containing precipitate, is achieved by adding the alkaline flue gas condensate provided in step 2 to a solution having a constantly regulated pH of 6-9. This solution is regulated by the addition of the second material.

It is preferred that the second material used for neutralising the alkaline flue gas condensate is a weak acid. Strong acids are not preferred as the use thereof may provide a difficult pH regulation. Even if such regulation is established, the use of strong acids would provide micro environments with an acidic pH (below a pH of 6). This is highly unwanted as an acidic pH may provide for re-dissolving of metal hydroxide and calcium-containing precipitates formed in the neutral flue gas condensate.

Adding the acid to the calcium-containing alkaline condensate causes calcium to precipitate. The composition of the precipitate depends on the acid added. If the acid added is $CO_2$ the major precipitate is $CaCO_3$.

It is believed that the method according to the present invention purifies the flue gas condensate by trapping contaminating substances in the calcium precipitate.

It was found that the precipitate formed by adding $CO_2$ (precipitate calcium as calcium carbonate) was superior in purifying the condensate. In addition to being superior in providing the superior precipitate calcium carbonate, $CO_2$ is readily available and may be provided by subjecting the produced water comprising dissolved calcium hydroxide to a stream of atmospheric air.

Preferably, the pH is lowered by use of gaseous $CO_2$. Thus, in a further preferred embodiment of the invention, the second material is gaseous $CO_2$, said $CO_2$ being bubbled through the alkaline condensate. In another preferred embodiment, the gas is atmospheric air or pure $CO_2$ or mixtures thereof.

In a further preferred embodiment of the invention, the $CO_2$ contact gas contains at least 1,000 ppm by volume of $CO_2$.

It is to be understood that the term "second material" according to the present invention may be any material causing the calcium present in the calcium-containing material to form a precipitate. For example, any material may be used that can bring about a precipitate with calcium, wherein the precipitate is poorly soluble in water. Thus the second material may be gaseous $CO_2$ or an aqueous solution thereof which is in the form of an aqueous solution of carbonic acid. The second material according to the present invention may also be any material suitable to lower the pH of solutions or suspensions at various stages of the process/method according to the present invention.

Further, it was also surprisingly discovered that flue gas was an excellent source of carbon dioxide, and that the quality of the purified condensate was not significantly affected by subjecting it to a stream of flue gas.

Accordingly, the supply of carbon dioxide by means of flue gas surprisingly provided a method capable of further purifying both flue gas and flue gas condensate at the same time.

Thus, in a preferred embodiment, the gas used for this purpose is flue gas. By using flue gas, an increased amount of flue gas is purified. In another preferred embodiment, the gas used for this purpose is flue gas provided after having been purified in a wet scrubber. In another highly preferred embodiment, the gas used for this purpose is flue gas provided after being condensed, e.g. in a heat exchanger.

In another highly preferred embodiment, the cooled flue gas, from which the flue gas condensate was obtained according to the present invention, is used for lowering the pH of the alkaline flue gas condensate. This results in a highly pure flue gas which may be safely discharged into the environment.

Thereby, the method according to the invention surprisingly solves the problems of transferring heat energy from flue gas to a reusable source, of purifying the flue gas condensate produced, and of purifying flue gas in a single simple and inexpensive process which produces products readily dischargeable into the environment or useable as resources for other purposes.

Importantly, when precipitating the dissolved calcium hydroxide in the condensate by use of $CO_2$, the pH value of the produced water should preferably be controlled such that the pH does not fall below a pH of 6.0.

At this pH value, the following reaction takes place: $CaCO_3+H_2O+CO_2 \rightarrow Ca(HCO_3)_2$. The formation of calcium bicarbonate should be avoided as it may impair the purification process.

Accordingly, when facilitating the precipitation of the dissolved calcium hydroxide in the condensate by addition of carbon dioxide, the pH of the produced water must be about 6.0 or above, and preferably it should be kept at a pH about 7.0 or above. Alternatively, the pH may be in the range of about 5.5 to about 6.5, such as e.g. about 6.5 to about 7.5, or such as e.g. about 5.5, such as e.g. about 6.0, such as e.g. about 6.5, such as e.g. about 7.0, such as e.g. about 7.5.

Surprisingly, it was observed that flue gas or atmospheric air was surprisingly effective and useful as source of carbon dioxide as it was observed that even excessive addition thereof did not result in the pH to fall below 6. Thus, it is not possible by this method to overdose the amount of $CO_2$ added in the process which may also obviate the need for monitoring the amount of $CO_2$ added.

Typically, the separation of the precipitated impurities from the purified condensate is achieved by using a decanter. However, a precipitation tank may also be used, wherein the precipitate settles due to gravitational forces, whereupon the purified condensate can be isolated. Using a decanter will reduce the time necessary for the separation.

Further, the isolation of the precipitate by a centrifuge may be more time-efficient when large amounts of condensate have to be handled.

Due to the simplicity of the method and the readily available and inexpensive constituents (lime, water and $CO_2$), the method according to the invention is readily suitable for implementation at various facilities.

Further, the invention comprises a system for performing a method according to the invention.

The inventive system comprises a first zone for adjusting the pH of the flue gas condensate, said first zone comprising means for regulating the influx of a calcium-containing alkaline material, said means comprising a pH sensor, a second zone for adjusting the pH of an alkaline flue gas condensate to a pH of 6-9, said second zone being in fluid communication with the first zone, said second zone having means for pumping a gaseous second material into the flue gas condensate, a third zone for separating the calcium-containing precipitate from the neutral flue gas condensate, said third zone being in fluid communication with the second zone, and said third zone having means comprising a decanter or a settle tank.

In a preferred embodiment, the system further comprises a condensation zone comprising a heat exchanger, said condensation zone being in fluid communication with the first zone of the system.

Increasingly, purified (or substantially pure) water is also valued as a resource. The purified flue gas condensate according to the invention is remarkably and unprecedentedly pure.

Accordingly, the present invention is also directed at purified flue gas condensate obtainable by the use of the inventive method. Accordingly, it was observed that it was possible to achieve a flue gas condensate having minute trace amounts of impurities being characteristic for the flue gas origin, wherein e.g. the condensate is substantially free of suspended matter, and having a sulphate concentration below 2,000 mg/l, a cadmium concentration below 0.5 µg/l and a barium concentration below 50 µg/l.

In comparison, in Denmark, natural drinking water is allowed to have a content of cadmium of 2 µg/l from the source, and tap water is allowed to have a content of cadmium of up to 5 µg/l. However, most sources of tap water in Denmark do not comply with the allowed cadmium limit of 5 µg/l.

Further, the purified flue gas condensate is saturated with respect to solubilised calcium salts. It is further sterile as the condensate has been distilled and been subjected to treatment with high alkaline material and sterile $CO_2$-containing gases. Such purified flue gas condensate has many applications, such as e.g. livestock watering, irrigation of crops, wetland habitat production, aquaculture and hydroponics. Accordingly, the invention also relates to purified flue gas condensate as such obtainable according to the inventive method having the further characteristics of originating from condensed flue gas.

In addition, the flue gas condensate purified according to the invention may be safely discharged into the environment. This is an essential element of the implementation of the invention, e.g. at large flue gas producing facilities, where the safe discharge of purified flue gas condensate has not been possible until the present invention. Accordingly, the invention also relates to purified flue gas condensate as such obtainable according to the inventive method having the further characteristics of originating from flue gas and the characteristic of being present at flue gas producing and flue gas purifying facilities.

Consequently, the invention relates to a method for treating flue gases or condensates thereof, the method comprising:

A first step of providing a flue gas and/or a condensate thereof;

A second step of contacting the flue gas or condensate thereof with a calcium-containing material;

Optionally a third step, subjecting the resulting liquid in step two to a cooling step, wherein the temperature of the resulting mixture between calcium containing material and sulphur containing gases or condensates is set to 60° C. or below;

A fourth step wherein the pH is regulated to 6-9 by addition of a second material, thereby allowing precipitation of a first calcium and sulphur-containing precipitate and a first liquid supernatant;

A fifth step wherein the first precipitate is separated from the first supernatant of the fourth step.

Furthermore, with respect to removal of sulphur-containing material in flue gases, it has been found that one or more of these objects are efficiently addressed by a method of treating a sulphur dioxide-containing flue gas or a condensate thereof or flue gas or condensate thereof comprising a sulphur-containing material, the method comprising a first step of contacting the flue gas with an aqueous scrubbing liquid in a scrubbing zone leading to absorption of sulphur dioxide into the liquid, a second step of establishing an at least partial flow of the liquid emanating from the first step from the scrubbing zone into a first regeneration zone, a third step of cooling the liquid to below 60° C., a fourth step of adjusting the pH of the liquid to 6-8 by adding CaO, $CaCO_3$, $Ca(OH)_2$ and/or a mixture thereof for forming a first precipitate containing sulphur and a first liquid supernatant, a fifth step of separating the first precipitate from the first liquid supernatant, a sixth step of recirculating a first partial flow of the first liquid supernatant emanating from the fifth step into the scrubbing zone for further absorption of sulphur dioxide, wherein the method further comprises a seventh step of establishing a second partial flow of the first liquid supernatant emanating from the fifth step into a second regeneration zone, an eighth step of adding CaO, $CaCO_3$, $Ca(OH)_2$ and/or a mixture thereof to the liquid in the second regeneration zone for adjusting the pH of the liquid to 9-14 for forming a second precipitate containing sulphur and a second liquid supernatant, a ninth step of separating the second precipitate from the second liquid supernatant, a tenth step of contacting the second liquid supernatant emanating from the ninth step with a $CO_2$-containing gas for lowering the pH of the liquid to 5-8, an eleventh step of discharging the resulting liquid emanating from the tenth step into a sewer system.

In another aspect, the present invention relates to a system for performing the method of the present invention, the system comprising a scrubbing zone fluidly connected to a first regeneration zone, a second regeneration zone fluidly connected to the first regeneration zone, and means to recirculate a fluid from the first regeneration zone to the scrubbing zone.

During the work leading to the present invention, the inventor surprisingly found that it is possible to meet all the above objects in a very simple method wherein the scrubbing liquid is regenerated in two treatment sequences in separate regeneration zones.

Thus, the invention relates to a method of treating a sulphur dioxide or sulphur compound-containing flue gas or condensates thereof, the method comprising a first step of contacting the flue gas with an aqueous scrubbing liquid in a scrubbing zone leading to absorption of sulphur dioxide into the liquid, a second step of establishing an at least partial flow of the liquid emanating from the first step from the scrubbing zone into a first regeneration zone, a third step of cooling the liquid to below 60° C., a fourth step of adjusting the pH of the liquid to 6-8 by adding CaO, $CaCO_3$, $Ca(OH)_2$ and/or a mixture thereof for forming a first precipitate containing sulphur and a first liquid supernatant, a fifth step of separating the first precipitate from the first liquid supernatant, a sixth step of recirculating a first partial flow of the first liquid supernatant emanating from the fifth step into the scrubbing zone for further absorption of sulphur dioxide, wherein the method further comprises a seventh step of establishing a second partial flow of the first liquid supernatant emanating from the fifth step into a second regeneration zone, an eighth step of adding CaO, $CaCO_3$, $Ca(OH)_2$ and/or a mixture thereof to the liquid in the second regeneration zone for adjusting the pH of the liquid to 9-14 for forming a second precipitate containing sulphur and a second liquid supernatant, a ninth step of separating the second precipitate from the second liquid supernatant, a tenth step of contacting the second liquid supernatant emanating from the ninth step with a $CO_2$ containing gas for lowering the pH of the liquid to 5-8, an eleventh step of discharging the resulting liquid supernatant emanating from the tenth step into a sewer system.

Accordingly, it is to be understood that the method of the invention is applicable to sulphur-containing compound present in flue gases or condensates thereof being e.g. thiols or mercaptanes (R—SH), sulphur trioxide ($SO_3$), sulphur dioxide ($SO_2$), sulphuric acid ($H_2SO_4$), $H_2SO_3$ or hydrogen sulphide ($H_2S$). It is also to be noted that $SO_2$ is mentioned in the text as an example of a sulphur compound present in flue gases or condensates thereof. However, the method can be used for removal of any sulphur-containing compound or mixtures thereof, such as e.g. thiols or mercaptanes (R—SH), sulphur trioxide ($SO_3$), sulphur dioxide ($SO_2$) or hydrogen sulphide ($H_2S$) or any mixtures thereof. The R-radical according to the invention may be any organic radical, such as e.g. methyl, ethyl, propyl, butyl, pentyl or hexyl, thienyl etc. A sulphur-containing material according to the invention may also have two or more sulphur atoms present, such as e.g. having two mercaptane groups such as e.g. ethane-dithiol. Moreover, other compounds such as e.g. thiophane, thiacyclohexane, 1,1,4a,6-tertamethyl-9-alkyl-1,2,3,4,4a,9b-hexahydrodibenzothiophenes, methyl-3,4,5-trimethyl-thienyl-sulfide, thiophene, benzothiophene etc. may also be present and may consequently also be removed by the method of present invention. It should be noted that even though the sulphur-containing compounds may not have any reactive functional groups, they may still adhere to the formed precipitate, e.g. calcium sulphate precipitates in the solution. Alternatively, such compounds may also be encapsulated by the substance forming a precipitate.

The overall goal of the absorption process in the first step is to remove gas phase impurities such as e.g. $SO_2$ from the flue gas. Typically, the scrubbing zone will comprise one or more conventional wet scrubbers facilitating and maximising contact between the scrubbing liquid and the flue gas. Typically, the scrubbing liquid will be re-circulated within the scrubbing zone to enhance absorption of $SO_2$.

According to the present invention, the scrubbing liquid may initially be tap water. The present invention obviates the need for adding alkaline compounds such as NaOH to the scrubbing zone since any such pH adjustment is "outsourced" to the regeneration zones. As the process proceeds, the composition of the scrubbing liquid in the scrubbing zone will obviously change over time due to absorption of $SO_2$ and other gaseous compounds in the liquid as well as due to the inherent recycling step of the present invention.

Without being bound by any theory, it is believed that as the composition of the scrubbing liquid changes over time due to absorption of the sulphur-containing compounds or gases, the solubility of sulphur-containing compounds increases in the scrubbing liquid allowing for an even more sufficient process.

At least a part of the scrubbing liquid is withdrawn from the scrubbing zone and fed into a first regeneration zone, wherein the scrubbing liquid is regenerated by precipitation of a sulphur-containing precipitate such as calcium sulphate. At least part of the scrubbing liquid may be recycled from the first regeneration zone into the scrubbing zone. Another part may be fed from the first zone into a second regeneration zone for further precipitation of sulphate to a level allowing discharge of the liquid into a sewer system.

Thus, the first zone regenerates and purifies the liquid from sulphate to a level allowing the liquid to be effective for further treating the flue gas in the scrubbing zone, i.e. a level allowing the liquid to be recycled to the scrubbing zone. Surprisingly, it has been found that the reintroduction of the liquid supernatant into the scrubber at this step and thus the use of the supernatant as scrubbing liquid in the wet scrubber leads to a significant decrease in precipitation of calcium salts inside the scrubber compared to prior art methods.

Typically, the sulphur-containing precipitates of the fourth and the eighth step, respectively, will contain calcium sulphate ($CaSO_4$) and/or calcium sulphite ($CaSO_3$). The precipitate may be discarded or it may be reused for a different purpose, e.g. sulphate may be used in the cement industry. In the respective fifth and ninth steps, the precipitate is separated from the liquid, preferably by gravity sedimentation.

The liquid fed from the scrubbing zone into the first regeneration zone is cooled to below 60° C. Preferably, the liquid is cooled to below 50° C. in the third step; most preferably to 20-40° C. The cooling step can for example be carried out by ordinary heat exchange means. The cooling effects a lower solubility of sulphate-containing precipitates and was also found to result in a precipitate slurry having a lower viscosity compared to higher temperatures. This facilitates withdrawal by pumping of the precipitate slurry. Also, below 60° C., less corrosion occurred in the subsequent regeneration zone. Consequently, during the process of cooling, the liquid is cooled to a temperature of about 80° C. or below, such as e.g. about 75° C. or below, about 70° C. or below, about 65° C. or below, about 60° C. or below, about 55° C. or below, about 50° C. or below, about 45° C. or below, about 40° C. or below, about 35° C. or below, about 30° C. or below, about 25° C. or below or about 20° C. or below. The temperature may also be regulated in a range of e.g. about 80° C. to about 20° C., such as e.g. in range of 70° C. to about 30° C., such as e.g. in range of 60° C. to about 40° C., or such as e.g. in range of 50° C. to about 20° C., such as e.g. in range of 40° C. to about 20° C., such as e.g. in range of 30° C. to about 20° C.

The steady state pH of the liquid leaving the scrubber is acidic—typically around pH 0-2. Preferably, the method of the present invention is carried out as a continuous method. In this case, the pH of the liquid within the scrubbing zone will become relatively constant which is referred to herein as steady state.

In the first regeneration zone, the pH of the liquid is adjusted to about 6-8 by adding CaO, $CaCO_3$ and/or $Ca(OH)_2$, whereby a sulphur-containing precipitate is obtained. Moreover, the pH may be adjusted to a pH of e.g. about between about 5 to about 14, such as e.g. between about 6 to about 9, such as e.g. between about 7 to about 8, or such as e.g. about 5.0, such as e.g. about 5.5, such as e.g. about 6.0, such as e.g. about 6.5, such as e.g. about 7.0, such as e.g. about 7.5, such as e.g. about 8.0, such as e.g. about 8.5, such as e.g. about 9.0, such as e.g. about 9.5, such as e.g. about 10.0, such as e.g. about 10.5, such as e.g. about 11.0, such as e.g. about 11.5, such as e.g. about 12.0, such as e.g. about 13.0, such as e.g. about 13.5, such as e.g. about 14.0. According to one embodiment of the invention, this may be done by directing the liquid into at least one reactor, preferably two or more reactors such as four reactors fluidly connected in series e.g. by using an ordinary overflow system. Having multiple series-connected reactors leads to more constant operational conditions, because variations are minimised from the first to the second reactor and so forth. In such embodiments, CaO, $CaCO_3$ and/or $Ca(OH)_2$ is preferably added only to the first reactor of the series.

The effect of CaO, $CaCO_3$ and/or calcium hydroxide addition in the fourth step is that the liquid is neutralised (around pH 7) and that calcium sulphate ($CaSO_4$) and or calcium sulphite ($CaSO_3$) precipitates to form a liquid suspension. However, approximately 2 g/L $CaSO_4$ will typically still remain dissolved in the aqueous phase. This is a too high sulphate concentration for discharge of the solution into the public sewer; but it has been found that such solution can be efficiently re-used for absorbing further $SO_2$ from flue gas.

Therefore, the key advancement of the present invention lies in the fact that only a part of the total process flow is purified for final discharge in the second regeneration zone, whereas the other part is recycled in the system.

In the second regeneration zone, increased precipitation of sulphur-containing precipitate is obtained in view of the lower solubility of calcium sulphate and/or calcium sulphite at basic pH levels. Also, heavy metal hydroxides will typically precipitate if heavy metals were present in the original flue gas. Consequently, in the method according to the invention, the liquid may be channelled into a second regeneration zone if the salt concentration gets too high. Such salts may e.g. be calcium salts in form of sulphate or chloride. In general, the salt concentration in the $1^{st}$ regeneration zone should not be so high so as to cause crystallisation/precipitation in the tubing/piping of the process apparatus which may cause clogging. Additionally, all environmental requirements have to be met. The inventor of the present invention has found that the salt concentration should not exceed about 4%. If the salt concentration exceeds 4%, the fluid is wholly or partially relayed to the second regeneration zone. In the second regeneration zone the pH may be raised e.g. to a pH of about 11-14, such as e.g. about 11 to about 13, such as e.g. 11 to about 12. It has been found that in this pH range, e.g. calcium sulphate exhibits a poorer solubility in water which in turn results in a precipitation of removal in the second regeneration zone.

In the tenth step, a $CO_2$-containing gas is used for pH adjustment since carbon dioxide is a mild acid making it easier to prevent too low pH values. Such too low pH values may be attained if e.g. HCl is used for lowering the pH. By contrast, the present system of constant $CO_2$ bubbling combined with $CaCO_3$ precipitation is excellently buffered with respect to pH. Such controlled conditions are highly desirable in particular if the method is carried out as a continuous process.

Typically, the treatment of the present invention will result in a liquid having a final concentration of dissolved sulphate which is below 200 mg/l and a pH of about 7, such as e.g. about 5, such as e.g. about 5.5., such as e.g. about 6, such as e.g. about 6.5, such as e.g. 7.5 such as e.g. about 8. Such an aqueous solution can then be discharged into the public sewer system because it has a substantially neutral pH and a sulphate concentration below the regulatory limit. The precipitate may be reused for any suitable purpose or it may be disposed as waste.

Optionally, any precipitates created in the tenth step are separated from the liquid supernatant prior to the discharge of the same in the eleventh step. Such separation can be carried out by gravity sedimentation.

In one embodiment of the present invention, no base is introduced into the scrubbing zone except from what is recirculated in the sixth step. In prior art processes, alkaline material is typically added to the scrubber, e.g. lime or NaOH. However, according to the present invention, it has surprisingly been found that a satisfactory removal of $SO_2$ or sulphur-containing compound from the flue gas or a condensate thereof can also be achieved by simply using tap water as the scrubbing liquid in combination with the unique regeneration and recirculation scheme of the present invention. This greatly facilitates operation of wet scrubber units in that unwanted calcium-containing precipitates and/or excessive amounts of sodium salt formation within the scrubbing zone are avoided. According to the present invention, there may be a small carryover of base (alkaline material) from the first regeneration zone back into the scrubbing zone. However, these amounts are small compared to prior art desulfurisation systems.

According to another embodiment, the aqueous scrubbing liquid in the scrubbing zone has an average steady state pH of 3-6, preferably 3-5 or such as e.g. about 2-7, such as e.g. about 3-6, such as e.g. about 4-5, or such as e.g. about 3, or such as e.g. about 3.5, or such as e.g. about 4, or such as e.g. about 4.5, or such as e.g. about 5, or such as e.g. about 5.5, or such as e.g. about 6, or such as e.g. about 6.5, or such as e.g. about 7, or such as e.g. about 7.5, or such as e.g. about 8. According to this embodiment, a slightly acidic scrubbing liquid is maintained. By contrast, prior art systems often operate at neutral steady state pH values which makes making it imperative to use large amounts of alkaline material within the scrubbing zone. By avoiding this according to the present invention, undesired precipitate formation within the scrubbing zone is avoided.

Preferably, the method of the present invention is continuous in that a continuous flow of scrubbing liquid into the first regeneration zone, a continuous recycling flow of liquid from the first regeneration zone into the scrubbing zone, a continuous flow of liquid from the first to the second regeneration zone, a continuous discharge of liquid from the second regeneration zone, a continuous flow of flue gas through the scrubbing zone, and a continuous flow of fresh scrubbing liquid, e.g. fresh tap water, into the scrubbing zone are established.

According to another embodiment, the $CO_2$-containing gas of the tenth step contains at least 1000 ppm by volume of $CO_2$. More preferably, it contains at least 10000 ppm by volume of $CO_2$, such as e.g. at least 8000 ppm, such as e.g. at least 6000 ppm, or such as e.g. at least 4000 ppm by volume of $CO_2$. By using these levels of $CO_2$, the pH adjustment of the tenth step works particularly advantageous.

According to another embodiment, the liquid of the eleventh step has a concentration of below 250 mg sulphate per litre. More preferably, the liquid of the eleventh step has a concentration of below 200 mg sulphate per litre, such as e.g. below 150 mg, such as e.g. below 100 mg, such as e.g. below 50 mg, such as e.g. below 25 mg, such as e.g. below 15 mg, such as e.g. below 10 mg, such as e.g. below 5 mg, such as e.g. below 2 mg, such as e.g. below 0.1 mg. The overall goal is to reduce the sulphate level of the finally regenerated liquid to a level allowing discharge into the public sewer.

According to another embodiment, the pH value is adjusted to 6.5-7.5 in the fourth step, or such as e.g. adjusted to about 5 to about 8, such as e.g. about 5.5 to about 7.5, such as e.g. 6 to about 7. The method of the present invention has been found to operate particularly efficient in this pH interval.

According to a preferred embodiment, $Ca(OH)_2$ is used in the fourth and in the eighth steps. This has been found to result in a particularly stable and efficient precipitation process.

According to another embodiment, the fifth step is carried out by sedimentation of precipitate in two or more fluidly connected sedimentation tanks.

According to another embodiment, the liquid is cooled to 25-35° C. in the third step or such as e.g. a temperature of about 20° C. to about 50° C., such as e.g. about 25° C. to about 45° C., such as e.g. about 30° C. to about 40° C. At this temperature interval the resulting precipitate slurry was found to exhibit a particularly low viscosity. Also, corrosion problems are minimised at this temperature interval.

According to another embodiment, the $CO_2$-containing gas of the tenth step is exhaust gas from a combustion device, optionally mixed with ambient air. This is a very simple and cost-efficient way of re-using some of the exhaust gas and to absorb some of the $CO_2$ contained in the same.

According to another embodiment, the first partial flow of the sixth step is at least equal to the amount of the second partial flow of the seventh step expressed in volume over time.

In other words, a considerable part of the flow is recirculated into the scrubbing zone, rather than being ultimately regenerated for discharge in the second regeneration zone. This makes the present method particularly cost-effective and efficient as the use of alkaline material such as $Ca(OH)_2$ is greatly reduced. Preferably, the first partial flow of the sixth step is at least two times, most preferably at least five times, the amount of the second partial flow of the seventh step being expressed in volume over time.

According to another embodiment, the fourth step further comprises bubbling the liquid with a $CO_2$-containing gas after adjusting the pH of the liquid to 6-8 by adding CaO, $CaCO_3$, $Ca(OH)_2$ and/or a mixture thereof.

In a preferred embodiment, the partial flow of the second step constitutes at least 10 vol %, such as at least 20 vol %, of the scrubbing liquid in the scrubbing zone per hour. If, for example, the total volume of scrubbing liquid in the scrubbing zone is 7000 litres, a flow of at least 700 litres per hour into the first regeneration zone is established. This has been found to result in a particularly stable and efficient process.

In a second aspect, the invention relates to a system comprising a scrubbing zone having means for contacting a flue gas with an aqueous scrubbing liquid, wherein the scrubbing zone is fluidly connected to a first regeneration zone, wherein the system further comprises a second regeneration zone fluidly connected to the first regeneration zone and means to recirculate a fluid from the first regeneration zone to the scrubbing zone, wherein the respective first and the second regeneration zones each comprises means for pH adjustment of the treated liquid by addition of CaO, $CaCO_3$, $Ca(OH)_2$ and/or a mixture thereof.

Typically, the scrubbing zone will comprise one or more conventional wet scrubbers. The respective first and second regeneration zones will typically comprise at least one reactor, at least one pH sensor disposed in the reactor, a storage container for CaO, $CaCO_3$, $Ca(OH)_2$ and/or a mixture thereof in solid form, liquid form, or as suspension, at least one pump for transferring the alkaline material into the reactor, and one or more sedimentation tanks. The second regeneration zone will typically also comprise an additional reactor and means for bubbling a $CO_2$-containing gas through liquid in that reactor.

In one embodiment, a plurality of fluidly series-connected sedimentation tanks is used in the first regeneration zone. Using a plurality of sedimentation tanks in this step increases the available surface area for sedimentation.

Description of The Drawings

Some of the embodiments of this invention will be described in detail, with reference to FIGS. 1-3.

FIG. 1 is a schematic flow chart of an embodiment of the inventive method and system.

Flue gas is produced in a plant 2 and is led through a heat exchanger 3 in order to cool the flue gas to a temperature below 60° C. Thereby a dirty flue gas condensate is produced. The condensate is directed into a reactor 4. In the reactor 4, the dirty flue gas condensate is added to an alkaline solution having a pH of 11-14 produced from addition of CaO and/or $Ca(OH)_2$ from a container 7 to the solution. Preferably, CaO and/or $Ca(OH)_2$ from a container 7 is added to the solution in the form of an aqueous solution or suspension of CaO and/or $Ca(OH)_2$ in water. In a preferred embodiment, the suspension of CaO and/or $Ca(OH)_2$ in water contains 1 kg $Ca(OH)_2$ in 10 kg water. The influx of CaO and/or $Ca(OH)_2$ from container 7 is regulated by a feedback loop involving a pH sensor 6, a valve and a pump (not shown). pH sensor 6 measures the pH value of the mixture in the reactor 4. If the pH reaches a lower cut-off value, e.g. a pH under 11, preferably under 12, the influx of $Ca(OH)_2$ and/or CaO is increased. The pH is regulated to the interval 11-14. The solution in reactor 4 is kept under constant agitation in order to prevent precipitates to settle at the bottom of the reactor.

The alkaline flue gas condensate of reactor 4 is directed further, optionally via a reactor 5 (which may be a pumping tank), into a reactor 9 comprising a neutral flue gas condensate solution. Having multiple series-connected reactors leads to more constant operational conditions, because variations are minimised from the first to the second reactor and so forth. The reactor 9 is connected to an air pump 8 which can inject air or $CO_2$-enriched air, or flue gas into the mixture. Preferably, the flue gas outlet of heat exchanger 3 is connected to the air pump 8, whereby the cooled flue gas from the heat exchange process is injected into reactor 9. By this process, the pH value is regulated in the neutral range, i.e. to a pH level between 6-9, preferably a pH of 7-8. A pH regulator (not shown) balances the injection of $CO_2$-containing gas with the influx of alkaline flue gas condensate such that the desired pH level is maintained. Preferably, the neutral flue gas condensate present in reactor 9 is kept under constant agitation, such that the precipitate of carbonate salts and metal compound precipitates is kept in suspension. This agitation may be achieved by the bubbling of a gas through the neutral flue gas condensate.

From there, the suspension is directed into a third zone comprising a suitable separation means such as a centrifuge or a sedimentation tank 10. In the third zone, the precipitate is allowed to settle, e.g. by gravity sedimentation. The precipitate contains mainly calcium carbonate and further contains calcium sulphate and/or calcium sulphite and metal or metalloid hydroxides, such as cadmium hydroxide, lead hydroxide, mercury hydroxide, barium hydroxide, and arsenic hydroxide. The precipitate may be removed from the tanks, for example through an appropriate outlet (not shown). The resulting supernatant/aqueous solution is withdrawn and may either be discharged into the public sewer or used as technically pure water for any suitable purpose for such water 11. The produced purified condensate has a substantially neutral pH, and the concentration of metals and/or sulphates in the aqueous liquid is reduced to safe limits. Fly ash components are reduced to substantially nothing. The precipitate may be reused for any suitable purpose or it may be disposed as waste.

Figure 2:
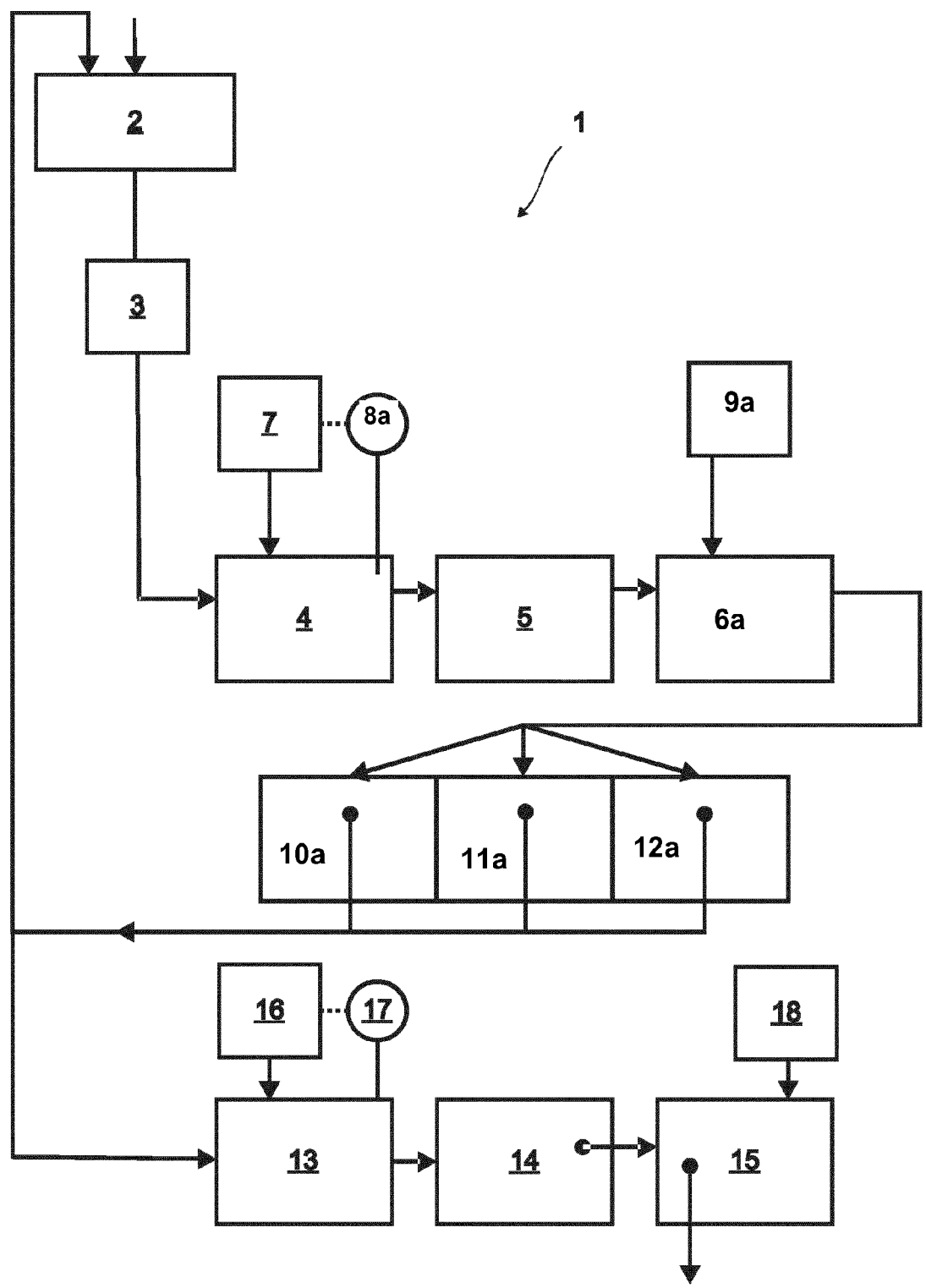
FIG. 2 is a schematic flow chart of the system according to the invention, with additional sedimentation tanks (10a, 11a, 12a)

FIG. 2 shows a schematic flow chart of an embodiment of the inventive method and system 1. Flue gas is treated in wet scrubber 2 using an aqueous scrubbing liquid with an initial pH between 6 and 8. The resulting acidic sulphate-containing solution is led through heat exchanger 3 to cool it to below 50° C. before being directed into reactor 4. Here, the solution is mixed with $CaCO_3$ and/or $Ca(OH)_2$ from container 7. The influx of $CaCO_3$ and/or $Ca(OH)_2$ from container 7 is regulated by a feedback loop involving pH sensor 8a, a valve and a pump (not shown). pH sensor 8a measures the pH value of the mixture in reactor 4. If the pH reaches a circumneutral upper cut-off value, e.g. pH 7.5, the influx of $Ca(OH)_2$ is stopped until the pH falls below a lower cut-off value, e.g. pH 6.5.

The mixture is directed further via reactor 5 into volume buffer container 6a being connected to an air pump 9a which can inject air or $CO_2$-enriched air into the mixture. From there, the suspension is directed into sedimentation tanks 10a, 11a, 12a. In sedimentation tanks 10a, 11a, 12a, the precipitate, which may contain calcium sulphate and/or calcium sulphite, is allowed to settled by gravity sedimentation. The sedimented precipitate can be removed from the tanks, for example through an appropriate outlet (not shown). The resulting supernatant is withdrawn and can either be recirculated into wet scrubber 2 for purifying flue gas or be directed into reactor 13.

In the latter, $Ca(OH)_2$ can be added to the solution from container 16, wherein the influx is again regulated by a feedback loop involving a pH sensor 17, a valve and a pump (not shown). The pH sensor measures the pH value of the mixture and triggers influx of $Ca(OH)_2$ up to a cut-off value of e.g. pH 11. The mixture is transferred to sedimentation tank 14, where the suspension containing calcium sulphate, calcium sulphite, calcium carbonate and/or heavy metal precipitates is separated into a precipitate and a supernatant by gravity sedimentation. The supernatant is transferred to container 15, where it is aerated with $CO_2$-enriched air using air pump 18. The resulting solution has sufficiently low concentrations of dissolved sulphate and heavy metals and can be discharged into the public sewer.

Figure 3:
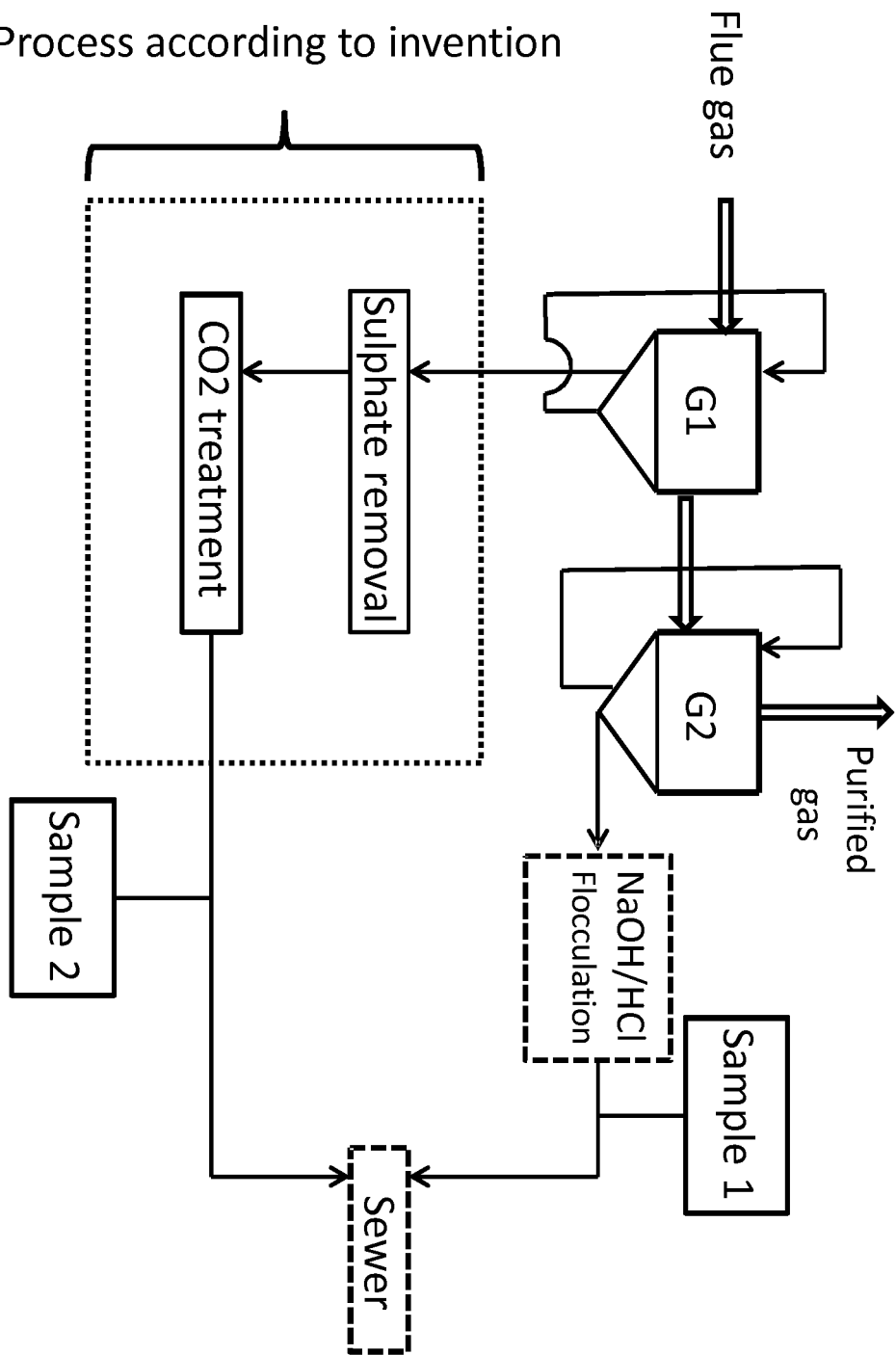
FIG. 3 is a schematic flow chart of the system according to the invention in comparison to a conventional process for purifying flue gases.

FIG. 3 illustrates the method according to present invention in comparison with conventional processes for purifying flue gases. The conventional method is illustrated by reactors G1 and G2, wherein flue gas is introduced into chamber G1 containing an aqueous solution which is recycled back into G1 by spray nozzles to maximise the surface of contact by flue gas and water. Then, the gas is transferred to G2, wherein the same process is repeated and the purified gas is then emitted into the atmosphere. Then, the aqueous phase resulting from this process undergoes a water purification step consisting of regulation of the pH by addition of NaOH and or HCl to afford a neutral pH. Then, the aqueous phase in transferred to a flocculation bath usually using ferric sulphate, ferric chloride etc. Finally, the aqueous phase is allowed to sediment, and the purified water is decanted prior to discharge into the sewer system. Samples are taken after each step of the process, and samples are thereafter analysed with respect to contents of metals/heavy metals, chloride, arsenic, sulphate and thallium.

EXAMPLE 1

Flue Gas Condensate

A large volume (a flow of approximately 3000 l/hour) of dirty flue gas condensate was treated using the method according to the invention and as explained with reference to FIG. 1. Initially, the flue gas condensate contained the following impurities:

| | |
|---|---|
| Suspended items (Mainly fly ash) | approximately 5 g/l |
| Cd | 80 µgram/l |
| Ba | 1000 µgram/l |
| $SO_4$ | 1,000 mg/l |

The flue gas condensate was led into the reactor 4, where it was mixed with a solution of CaO added from the container 7. The pH of the solution was between 13 and 14. The amount of alkali was regulated by a pH sensor measuring the pH and adjusted to increase flow of the alkaline material whenever a pH of below 12 was reached (due to the addition of dirty flue gas condensate). Both heavy metals and the $SO_4$ compounds precipitated, but were kept in suspension by constant agitation of the solution. From there the alkaline fluid gas condensate was directed into a buffer container which was aerated with $CO_2$-containing gas, and wherein the pH was constantly adjusted to a value of about 7 by balancing the inlet of gas with the inflow of alkaline flue gas condensate. The formation of a calcium carbonate precipitate was observed and it was observed that the heavy metals and the $SO_4$ compounds coprecipitated. The precipitates were kept in suspension by constant agitation of the solution. The neutral flue gas condensate produced was directed into a decanter for separating it into a solid part containing the precipitate and a liquid part consisting of the purified flue gas condensate.

The dirty flue gas condensate was observed to be brown, cloudy and unclear. The purified neutral flue gas was a clear liquid.

The purified flue gas condensate was analysed, and the following concentration of the impurities was measured in the purified condensate:

| | |
|---|---|
| Suspended solid matter | not detected |
| Cd | less than 0.045 µgram/l (limit of detection) |
| Ba | 19 µgram/l |
| $SO_4$ | 160 mg/l |

As seen by these results, the purification process according to the invention results in a significant reduction of undesired compounds.

EXAMPLE 2

Wet Scrubbing of Flue Gas from Waste Incineration

Flue gas from waste incineration was treated in a system according to the invention. Approx. 40,000 normal $m^3$ flue gases entered the scrubbing zone per hour. The scrubbing liquid was sprayed from nozzles within the scrubber into contact with the gas. To obtain a higher contact surface between liquid and gas, the scrubbing liquid was continuously recirculated in a loop circumventing the regeneration zone. The flow of this loop was approx. 330 $m^3$ per hour.

The volume of liquid in the scrubbing zone was approx. 7 $m^3$. Initially, this liquid was tap water, but as the process was running, the supernatant liquid of the first regeneration zone was recirculated and mixed with the tap water. This liquid had a circumneutral pH prior to contacting the acids (e.g. sulphur dioxide) of the flue gas.

A flow of 1,500 litres per hour of the scrubbing liquid was led into the first regeneration zone, first entering a heat exchanger for cooling to approx. 30° C., and from there the liquid was directed into the first reactor. $Ca(OH)_2$ was added to the first reactor. The amount of $Ca(OH)_2$ was regulated by a feedback loop involving a pH sensor, a valve and a pump. The pH sensor measured the pH value of the mixture in the reactor and was adjusted to stop the flow of $Ca(OH)_2$ into the first reactor, when the pH reached 7. In this way, approx. 25 kg of $Ca(OH)_2$ was added each hour. The first reactor was connected by a regular overflow system to a second reactor and so forth to end up in a fourth reactor.

From here, the liquid was directed into a container that was aerated with a $CO_2$-containing gas.

From this container, the liquid was pumped into a distribution pipe that distributed the liquid into 28 tanks each having a surface area of 1 $m^2$ in which the precipitated calcium sulphate was allowed to sediment by gravity. The filtration product was pressed and the resulting liquid, together with the supernatant liquid from the sedimentation tanks, was recirculated into the scrubber as regenerated scrubbing liquid.

EXAMPLE 3

Purification of Scrubbing Liquid to Allow Discharge into the Sewer

Flue gas was treated as described in example 1, but part of the supernatant liquid was directed into a container for further purification to allow discharge into the sewer. The purpose of this treatment is to further reduce the content of dissolved sulphate to a level below the threshold limits for discharge into the sewer.

A flow of approx. 200 litres per hour of the supernatant emanating from the sedimentation tanks was directed into a second regeneration zone. The liquid was directed into a reactor, wherein $Ca(OH)_2$ was added to the solution. A pH sensor measured the pH value of the mixture and triggered the influx of $Ca(OH)_2$ up to a cut-off value of pH 11. The mixture was transferred to another container where it was aerated with $CO_2$-enriched air using an air pump to lower the pH to pH 7. The resulting suspension containing precipitated calcium sulphate and calcium carbonate was then led into a sedimentation tank to separate the solid phase from the liquid phase by gravity. The resulting liquid had a concentration of dissolved sulphate of 200 mg per litre and a neutral pH and was therefore acceptable for discharge into the public sewer.

EXAMPLE 4

Illustrative Comparison of the Method of Present Invention and Conventional Method Using NaOH/HCl and Flocculation with Reference to FIG. 3

Flue gas is introduced into a first chamber G1 which initially contains water. In the comparison test, one part of the contents of G1 is treated according to examples 2 or 3 above. In the conventional process, flue gas is introduced into chamber G1 containing an aqueous solution (typically 400 L) which is continuously recycled back into G1 by spray nozzles to maximise the surface of contact by flue gas and water. Then, the gas is further passed on to G2, wherein the same process is repeated and the purified gas is then emitted into the atmosphere. Then, the aqueous phase resulting from this process (ca. 200 L) undergoes a water purification step consisting of regulation of the pH by addition of NaOH (ca. 6M) and/or HCl (ca. 6M) to afford a neutral pH, such that the pH of the solution is about 6-7. Then, the aqueous phase is transferred to a flocculation bath usually using ferric sulphate (typically 1-5 kgs per 100 L water) upon agitation/stirring for a few minutes. Finally, the aqueous phase is allowed to sediment in order to remove the flocculant, and the purified water is decanted prior to discharge into the sewer system. After the respective processes, analysis of the water was undertaken to monitor the efficiency of the respective processes (samples denoted as sample 1 for the standard process and sample 2 for the process according to the invention). The analysis of the process water was conducted using standardised methods and specified by their ISO standard identification number and well known to a person skilled in the art.

Results (with reference to FIG. 3):

TABLE 1

(water analysis of sample 1 based on water sample from conventional/standard process using reactors G1 and G2 and NaOH/HCl and flocculation):

| Element | Analysis Method | Unit | Amount |
|---|---|---|---|
| Suspended matter | DS/EN 872 | mg/L | 1400 |
| Chloride, filtered | SM 17.udg. 4500 | mg/L | 24000 |
| Sulphate, filtered | SM 17.udg. 4500 | mg/L | 2800 |
| Arsenic | ISO17294m-ICPMS | µg/L | 55 |
| Lead | ISO17294m-ICPMS | µg/L | 960 |
| Cadmium | ISO17294m-ICPMS | µg/L | 36 |
| Chromium | ISO17294m-ICPMS | µg/L | 3400 |
| Copper | ISO17294m-ICPMS | µg/L | 130 |
| Mercury | ISO17294m-ICPMS | µg/L | 6800 |
| Nickel | ISO17294m-ICPMS | µg/L | 9000 |
| Thallium | ISO17294m-ICPMS | µg/L | 0.71 |
| Zinc | ISO17294m-ICPMS | µg/L | 2300 |

TABLE 2

(water analysis of sample 2 based on water sample from process according to present invention):

| Element | Analysis Method | Unit | Amount |
|---|---|---|---|
| Suspended matter | DS/EN 872 | mg/L | 380 |
| Chloride, filtered | SM 17.udg. 4500 | mg/L | 67000 |
| Sulphate, filtered | SM 17.udg. 4500 | mg/L | 730 |
| Arsenic | ISO17294m-ICPMS | µg/L | <0.80 |
| Lead | ISO17294m-ICPMS | µg/L | 190 |
| Cadmium | ISO17294m-ICPMS | µg/L | 0.16 |
| Chromium | ISO17294m-ICPMS | µg/L | 230 |
| Copper | ISO17294m-ICPMS | µg/L | 4.9 |
| Mercury | ISO17294m-ICPMS | µg/L | 530 |
| Nickel | ISO17294m-ICPMS | µg/L | 210 |
| Thallium | ISO17294m-ICPMS | µg/L | <0.40 |
| Zinc | ISO17294m-ICPMS | µg/L | 99 |

Thus, it can clearly be seen that the method according to the present invention offers a far better method of purification of flue gas or a condensate thereof.

In one aspect, the invention also relates to the following items

Items

1. A method for treating flue gas condensate, the method comprising;
a first step of providing a flue gas condensate;
a second step of adding a calcium containing alkaline material and adjusting the pH of the flue gas condensate provided in step 1 to a pH of 11-14, thereby providing an alkaline flue gas condensate;
a third step of adjusting the pH of the alkaline flue gas condensate provided in step 2 to a pH of 6-9 by adding a second material, whereby a neutral flue gas condensate comprising a calcium-containing precipitate is formed;
a fourth step of separating the calcium-containing precipitate from the neutral flue gas condensate of step 3, thereby providing a retentate and a purified flue gas condensate.
2. Method according to item 1, wherein the flue gas is obtained from burning of biofuel, such as chip, straw, wood and energy tablets.
3. Method according to item 1 or 2, wherein the flue gas condensate provided in step 1 contains one or more impurities selected from the group comprising fly ash, sulphur salts and heavy metals, such as lead, cadmium, mercury and barium salts.
4. Method according to any of the previous items, wherein the flue gas condensate is provided by lowering the temperature of the flue gas to below 60° C. by means of heat exchange between the flue gas and a liquid which is to be heated by means of the burning of fuels producing the flue gas.

5. Method according to any of the previous items, wherein the calcium-containing alkaline material is an aqueous suspension or solution of $Ca(OH)_2$ or CaO or a mixture thereof.

6. Method according to any of the previous items, wherein the second material is a gas comprising $CO_2$, said gas being bubbled through the alkaline flue gas condensate provided in step 2.

7. Method according to item 6, wherein the gas is selected among flue gas, atmospheric air, and gaseous $CO_2$ and mixtures thereof.

8. Method according item 4, wherein the $CO_2$ contact gas contains at least 1000 ppm by volume of $CO_2$.

9. Method according to any of the above items wherein the second step of adding a calcium containing alkaline material and adjusting the pH of the flue gas condensate provided in step 1 to a pH of 11-14, thereby providing an alkaline flue gas condensate, is achieved by adding the flue gas condensate provided in step 1 to a calcium containing alkaline material having a constantly regulated pH of 11-14.

10. Method according to any of the above items wherein the third step of adjusting the pH of the alkaline flue gas condensate provided in step 2 to a pH of 6-9 by adding a second material, whereby a neutral flue gas condensate comprising a calcium containing precipitate is formed, is achieved by adding the alkaline flue gas condensate provided in step 2 to a solution having a constantly regulated pH of 6-9.

11. A purified flue gas condensate obtainable according to the method of any of the items 1-10.

12. A system for performing the method of any of the preceding items, wherein the system comprises a first zone for adjusting the pH of the flue gas condensate, said first zone comprising means for regulating the influx of a calcium-containing alkaline material, said means comprising a pH sensor; a second zone for adjusting the pH of an alkaline flue gas condensate to pH 6-9, said second zone being in fluid communication with the first zone, said second zone having means for delivering a gaseous second material into the flue gas condensate; a third zone for separating the calcium-containing precipitate from the neutral flue gas condensate, said third zone being in fluid communication with the second zone, and said third zone having means comprising a separation means such as a decanter or a settle tank.

13. System according to item 12, wherein the system further comprises a condensation zone comprising a heat exchanger, said condensation zone being in fluid communication with the first zone.

14. System according to item 12 or 13, wherein the means for delivering a gaseous second material into the flue gas condensate in the second zone are in gaseous communication with a source of flue gas.

15. System according to item 14, wherein the source of flue gas is a heat exchanger producing cooled flue gas.

In a further aspect, the invention also relates to the following articles:

Articles

1. A method of treating a sulphur dioxide containing flue gas, the method comprising
a first step of contacting the flue gas with an aqueous scrubbing liquid in a scrubbing zone leading to absorption of sulphur dioxide into the liquid,
a second step of establishing an at least partial flow of the liquid emanating from the first step from the scrubbing zone into a first regeneration zone,
a third step of cooling the liquid to below 60° C.,
a fourth step of adjusting the pH of the liquid to 6-8 by adding CaO, $CaCO_3$, $Ca(OH)_2$ or a mixture thereof for forming a first precipitate containing sulphur and a first liquid supernatant,
a fifth step of separating the first precipitate from the first liquid supernatant,
a sixth step of recirculating a first partial flow of the first liquid supernatant emanating from the fifth step into the scrubbing zone for further absorption of sulphur dioxide, wherein the method further comprises
a seventh step of establishing a second partial flow of the first liquid supernatant emanating from the fifth step into a second regeneration zone,
an eighth step of adding CaO, $CaCO_3$, $Ca(OH)_2$ and/or a mixture thereof to the liquid in the second regeneration zone for adjusting the pH of the liquid to 9-14 for forming a second precipitate containing sulphur and a second liquid supernatant,
a ninth step of separating the second precipitate from the second liquid supernatant,
a tenth step of contacting the second liquid supernatant emanating from the ninth step with a $CO_2$ containing gas for lowering the pH of the liquid to 5-8,
an eleventh step of discharging the resulting liquid emanating from the tenth step into a sewer system.

2. A method according to article 1, wherein no base is introduced into the scrubbing zone except from what is recirculated in the sixth step.

3. A method according to articles 1 or 2, wherein the method is continuous.

4. A method according to any of the preceding articles, wherein the $CO_2$ containing gas of the tenth step contains at least 1000 ppm by volume of $CO_2$ 5. A method according to any of the preceding articles, wherein the liquid of the eleventh step has a concentration of below 250 mg sulphate per litre.

6. A method according to any of the above articles, wherein the pH value is adjusted to 6.5-7.5 in the fourth step.

7. A method according to any of the above articles, wherein $Ca(OH)_2$ is used in the fourth and in the eighth step.

8. A method according to any of the above articles, wherein the fifth step is carried out by sedimentation of precipitate in two or more fluidly connected sedimentation tanks.

9. A method according to any of the above articles, wherein the liquid is cooled to 25-35° C. in the third step.

10. A method according to any of the above articles, wherein the $CO_2$-containing gas of the tenth step is exhaust gas from a combustion device, optionally mixed with ambient air.

11. A method according to any of the above articles, wherein the first partial flow of the sixth step is at least equal to the amount of the second partial flow of the seventh step expressed in volume over time.

12. A method according to any of the above articles, wherein the first partial flow of the sixth step is at least five times the amount of the second partial flow of the seventh step expressed in volume over time.

13. A method according to any of the above articles, wherein the fourth step further comprises bubbling the liquid with a $CO_2$ containing gas after adjusting the pH of the liquid to 6-8 by adding CaO, $CaCO_3$, $Ca(OH)_2$ and/or a mixture thereof.

14. A method according to any of the above articles, wherein the partial flow of the second step constitutes at least 10 vol % of the scrubbing liquid in the scrubbing zone per hour.

15. A system for performing the method of articles 1-14, the system comprising a scrubbing zone (2) having means for contacting a flue gas with an aqueous scrubbing liquid, wherein the scrubbing zone (2) is fluidly connected to a first regeneration zone (3, 4, 5, 6a, 7, 8a, 9a, 10a, 11a, 12a), wherein the system further comprises a second regeneration zone (13, 14, 15, 16, 18) fluidly connected to the first regeneration zone and means to recirculate a fluid from the first regeneration zone to the scrubbing zone, wherein the respective first and the second regeneration zones each comprise means for pH adjustment (7, 8a, 16, 17) of the treated liquid by addition of CaO, $CaCO_3$, $Ca(OH)_2$ or a mixture thereof.

The invention claimed is:

1. A method for treating flue gases and/or condensates thereof, the method comprising:
    providing a flue gas and/or a condensate thereof comprising sulphur-containing compounds;
    contacting the flue gas and/or condensate thereof with a calcium-containing material to produce a resulting liquid;
    subjecting the resulting liquid to a cooling step at a temperature of about 60° C. or below; and
    adding a second material to regulate the pH to a range of about 6 to about 9, thereby allowing precipitation of a first calcium and sulphur-containing precipitate and a first liquid supernatant;
    wherein the first precipitate is separated, by gravity sedimentation or centrifugation, from the first liquid supernatant.

2. The method according to claim 1, wherein the contacting the flue gas and/or condensate thereof with a calcium-containing material comprises adding an alkaline calcium-containing material to the flue gas and/or condensate thereof, such that the pH is in a range of about 11 to about 14, thereby providing an alkaline flue gas condensate.

3. The method according to claim 2, wherein the second material is a $CO_2$-containing gas, said $CO_2$-containing gas being bubbled through the alkaline flue gas condensate.

4. The method according to claim 3, wherein the $CO_2$-containing gas contains at least 1000 ppm by volume of $CO_2$.

5. The method according to claim 2, wherein the adding a calcium-containing alkaline material comprises adding a calcium-containing alkaline material having a constantly regulated pH of 11-14.

6. The method according to claim 1, wherein the flue gas is obtained from burning of biofuel.

7. The method according to claim 1, wherein the flue gas and/or condensate thereof contains one or more impurities selected from the group consisting of fly ash, sulphur salts and heavy metals, selected from the group lead, cadmium, mercury and barium salts.

8. The method according to claim 1, wherein the flue gas and/or condensate thereof is provided by lowering the temperature of the flue gas to below 90° C. by means of heat exchange between the flue gas and a liquid which is to be heated by means of the burning of fuels producing the flue gas.

9. The method according to claim 1, wherein the calcium-containing material is an aqueous suspension or solution of $Ca(OH)_2$, CaO or $CaCO_3$ or a mixture thereof.

10. The method according to claim 1, wherein the second material is a $CO_2$-containing gas comprising at least one of flue gas, atmospheric air, or gaseous $CO_2$.

11. The method according to claim 1, wherein the adding a second material comprises adding a solution having a constantly regulated pH of 6-9.

12. The method according to claim 1, wherein the flue gas and/or condensate thereof is contacted with a calcium-containing material which is an aqueous scrubbing liquid in a scrubbing zone leading to absorption of sulphur-containing gases in the liquid.

13. The method according to claim 1, further comprising establishing an at least partial flow of the resulting liquid into a first regeneration zone.

14. The method according to claim 1, the method further comprising:
    upon separating the first liquid supernatant from the first precipitate;
    recirculating a first partial flow of the first liquid supernatant into a scrubbing zone for absorption of sulphur-containing gas;
    establishing a second partial flow of the first liquid supernatant into a second regeneration zone;
    adding CaO, $CaCO_3$, $Ca(OH)_2$ and/or a mixture thereof to the first liquid supernatant in the second regeneration zone for adjusting the pH of the first liquid supernatant to a range of about 9-14 for forming a second precipitate containing sulphur and a second liquid supernatant;
    separating the second precipitate from the second liquid supernatant;
    contacting the second liquid supernatant with a $CO_2$-containing gas for lowering the pH of the second liquid supernatant to a range of about 5 to about 8; wherein
    the resulting liquid supernatant is discharged into a sewer system.

15. The method according to claim 14, wherein no base is introduced into the scrubbing zone except from what is recirculated in the recirculating step.

16. The method according to claim 14, wherein the contacting the second liquid supernatant with a $CO_2$-containing gas comprises contacting the second liquid supernatant with a $CO_2$-containing gas that contains at least 1000 ppm by volume of $CO_2$.

17. The method according to claim 14, wherein the resulting liquid supernatant that is discharged into the sewer system has a concentration of below 250 mg sulphate per litre.

18. The method according to claim 14, wherein the contacting the second liquid supernatant with a $CO_2$-containing gas comprises contacting the second liquid supernatant with exhaust gas from a combustion device.

19. The method according to claim 14, wherein the rate of the first partial flow is at least equal to the rate of the second partial flow expressed in volume over time.

20. The method according to claim 14, wherein the rate of the first partial flow is at least five times the rate of the second partial flow expressed in volume over time.

21. The method according to claim 14, wherein the second material comprises $Ca(OH)_2$, and wherein the adding CaO, $CaCO_3$, $Ca(OH)_2$ and/or a mixture thereof comprises adding $Ca(OH)_2$.

22. The method according claim 14, wherein the contacting the second liquid supernatant with a $CO_2$-containing gas comprises contacting the second liquid supernatant with exhaust gas from a combustion device mixed with ambient air.

23. The method according to claim 1, wherein the method is continuous.

24. The method according to claim 1, wherein the adding the second material to regulate the pH comprises adjusting the pH value to a range of 6.5-7.5.

25. The method according to claim 1, wherein the second material comprises $Ca(OH)_2$.

26. The method according to claim 1, wherein the first precipitate is separated from the first liquid supernatant by sedimentation of precipitate in two or more fluidly connected sedimentation tanks.

27. The method according to claim 1, wherein the subjecting the resulting liquid to a cooling step comprises cooling the resulting liquid to 25-55° C.

28. The method according to claim 1, wherein the step of adding a second material further comprises bubbling the liquid with a $CO_2$-containing gas after adjusting the pH of the liquid to 6-8 by adding at least one of $CaO$, $CaCO_3$, or $Ca(OH)_2$.

29. The method according to claim 1, wherein a partial flow of the contacting step constitutes at least 10 vol% of a scrubbing liquid in a scrubbing zone per hour.

30. The method according to claim 1, wherein the flue gas is obtained from burning chip, straw, wood, waste incineration, exhaust from combustion engines, gas combustion, oil production or energy tablets.

31. A system for performing the method according to claim 1, the system comprising:
 a first chamber, wherein flue gas is produced in the first chamber or introduced into the first chamber,
 the first chamber being connected to a heat exchanger,
 the heat exchanger being connected to a second chamber which is connected to a third chamber comprising calcium-containing materials and a feedback loop involving a pH sensor —wherein the pH sensor measures the pH of contents of the second chamber, and wherein the pH is set to either a range of about 11 to about 14 or to a range of about 6 to about 9 by addition of calcium-containing materials from the third chamber,
 a fourth at least one chamber connected to an air pump,
 a fifth chamber that is a sedimentation chamber comprising one of zero, one, two or three subdivisions, wherein precipitation from the method is allowed to sediment by means of gravitation and/or centrifugation,
 an outlet for discharging purified liquid from the sedimentation chamber.

32. The system according to claim 31, wherein the system further comprises a condensation zone comprising a heat exchanger, wherein said condensation zone is in fluid communication with a first zone.

33. The system according to claim 31, further comprising a second zone, and means for delivering the second material to flue gas condensate in the second zone, wherein the means for delivering is/are in gaseous communication with a source of flue gas.

34. The system according to claim 33, wherein the source of flue gas is a heat exchanger producing cooled flue gas.

35. The system according to claim 31, further comprising;
 a sixth chamber being connected to a seventh chamber comprising calcium-containing materials and a feedback loop involving a pH sensor, and wherein the pH sensor measures the pH of the contents of the sixth chamber, and wherein the pH is set to about 11 to about 14 by addition of calcium-containing materials from the seventh chamber,
 a sedimentation tank, wherein resulting suspension is allowed to precipitate and is separated from supernatant,
 a tank to which the supernatant is transferred and further treated with $CO_2$-enriched air by a pump, and wherein the tank comprises means to discharge resulting purified liquid from the process.

36. The system of claim 31, further comprising another chamber comprising a reactor, wherein the contents of the second chamber are passed therethrough.

37. The system of claim 36, wherein the another chamber is a pumping tank.

38. The system of claim 31, wherein air from the air pump is enriched with $CO_2$.

39. The system of claim 31, further comprising means to recycle the purified liquid from the outlet of the sedimentation chamber back to the first chamber.

40. The system according to claim 39, wherein the means to recycle the purified liquid is a three way valve.

41. The system of claim 31, further comprising means to channel the purified liquid from the outlet of the sedimentation chambers to a second regeneration zone comprising chambers.

* * * * *